(12) United States Patent
Schuman

(10) Patent No.: US 10,663,563 B2
(45) Date of Patent: *May 26, 2020

(54) ON-SITE CALIBRATION OF ARRAY ANTENNA SYSTEMS

(71) Applicant: SRC, Inc., North Syracuse, NY (US)

(72) Inventor: Harvey K. Schuman, Fayetteville, NY (US)

(73) Assignee: SRC, Inc., North Syracuse, NY (US)

( * ) Notice: Subject to any disclaimer, the term of this patent is extended or adjusted under 35 U.S.C. 154(b) by 236 days.

This patent is subject to a terminal disclaimer.

(21) Appl. No.: 15/715,568

(22) Filed: Sep. 26, 2017

(65) Prior Publication Data

US 2018/0164407 A1   Jun. 14, 2018

Related U.S. Application Data

(63) Continuation of application No. 14/547,461, filed on Nov. 19, 2014, now Pat. No. 9,791,552.

(51) Int. Cl.
  *G01S 7/40* (2006.01)
  *G01S 13/44* (2006.01)
  *G01S 7/28* (2006.01)

(52) U.S. Cl.
  CPC .............. *G01S 7/4026* (2013.01); *G01S 7/40* (2013.01); *G01S 7/2813* (2013.01); *G01S 13/4463* (2013.01)

(58) Field of Classification Search
  CPC ...... G01S 5/021; G01S 5/0252; G01S 7/2813; G01S 7/40; G01S 7/4004; G01S 7/4008; G01S 7/4021; G01S 7/4026; G01S 7/4052; G01S 2007/406; G01S 2007/4078; G01S 2007/4082; G01S 13/4463

See application file for complete search history.

(56) References Cited

U.S. PATENT DOCUMENTS

| H0548 H | * | 11/1988 | Holliday | ................. 342/145 |
| 5,572,219 A | * | 11/1996 | Silverstein | ............ H01Q 3/005 342/165 |

(Continued)

OTHER PUBLICATIONS

Chen et al., "Array calibration for compensating gain/phase mismatch and mutual coupling effects in Smart Antenna Systems", 2008 IEEE International Symposium on Wireless Communication Systems [Online] 2008, pp. 483-487.

(Continued)

*Primary Examiner* — Peter M Bythrow
(74) *Attorney, Agent, or Firm* — Bond Schoeneck & King, PLLC; George McGuire; Jonathan Gray

(57) ABSTRACT

The present invention is directed to an antenna system and a method that is configured to compute calibration element voltage gain patterns as functions of a digital antenna model and a plurality of complex beamformer voltages, determine calibration through path transfer functions from the plurality of complex voltages, and remove the calibration element voltage gain patterns from the calibration through path transfer functions to determine a beamforming network transfer function. The beamforming network transfer function and the far-field element voltage gain patterns are combined to obtain a system transfer function used to revise a calibration table.

36 Claims, 10 Drawing Sheets

(56) References Cited

U.S. PATENT DOCUMENTS

| | | | | |
|---|---|---|---|---|
| 5,581,517 | A * | 12/1996 | Gee | G01S 7/52046 367/11 |
| 5,680,141 | A * | 10/1997 | Didomenico | H01Q 3/267 342/157 |
| 5,929,810 | A * | 7/1999 | Koutsoudis | H01Q 3/267 342/174 |
| 6,084,545 | A * | 7/2000 | Lier | H01Q 3/267 342/174 |
| 6,163,296 | A * | 12/2000 | Lier | G01S 3/14 342/154 |
| 6,356,233 | B1 * | 3/2002 | Miller | H01Q 3/267 342/174 |
| 6,384,781 | B1 * | 5/2002 | Kautz | H01Q 3/267 342/174 |
| 6,507,315 | B2 * | 1/2003 | Purdy | H01Q 3/267 342/174 |
| 6,598,014 | B1 * | 7/2003 | Rabideau | G01S 3/023 342/378 |
| 6,690,952 | B2 * | 2/2004 | Nishimori | H01Q 3/2605 342/174 |
| 7,629,921 | B1 | 12/2009 | Manry et al. | |
| 7,701,393 | B2 | 4/2010 | Bornholdt | |
| 8,165,095 | B2 | 4/2012 | Stratis et al. | |
| 8,199,048 | B1 * | 6/2012 | Medina Sanchez | G01S 7/4004 342/174 |
| 8,686,896 | B2 * | 4/2014 | Schuman | G01S 7/4026 342/165 |
| 2006/0114147 | A1 * | 6/2006 | Boonstra | G01S 3/023 342/174 |
| 2008/0036648 | A1 * | 2/2008 | Green | G01S 7/4017 342/174 |
| 2008/0143605 | A1 * | 6/2008 | Bornholdt | G01S 5/0252 342/451 |
| 2009/0153394 | A1 * | 6/2009 | Navarro | G01S 7/4017 342/174 |
| 2009/0201206 | A1 * | 8/2009 | Li | G01S 7/2813 342/373 |
| 2011/0080267 | A1 * | 4/2011 | Clare | G01S 13/82 340/10.4 |
| 2011/0273326 | A1 * | 11/2011 | Shirakawa | G01S 7/40 342/25 R |
| 2012/0010862 | A1 | 1/2012 | Costen | |
| 2012/0013501 | A1 | 1/2012 | Ferretti et al. | |
| 2012/0139776 | A1 * | 6/2012 | Malmqvist | H01Q 3/267 342/174 |
| 2012/0206291 | A1 * | 8/2012 | Schuman | G01S 7/4026 342/174 |
| 2013/0113652 | A1 * | 5/2013 | Smits | G01S 7/4004 342/174 |
| 2013/0229300 | A1 * | 9/2013 | Izumi | G01S 7/4026 342/156 |
| 2013/0234883 | A1 * | 9/2013 | Ma | H01Q 3/267 342/174 |
| 2014/0111373 | A1 * | 4/2014 | Puzella | G01S 7/032 342/174 |

OTHER PUBLICATIONS

Dandekar et al., "Computational electromagnetic simulation of smart antenna systems in urban microcellular environments" IEEE Transactions on Vehicular Technology [Online] 2003, 52 (4), pp. 733-742.

Dandekar et al., "Smart antenna array calibration procedure including amplitude and phase mismatch and mutual coupling effects," 2000 IEEE International Conference on Personal Wireless Communications [Online] 2000, pp. 293-297.

Wen-Jun et al., "Amplitude-only optimizing method of multi-subaperture multi-beam antenna for SAR applications" 2011 International Conference on Electronics, Communications and Control [Online] 2011, pp. 117-120.

Silverstein, S.D., "Application of orthogonal codes to the calibration of active phased array antennas for communication satellites," Signal Processing, IEEE Transactions on , vol. 45, No. 1, pp. 206,218, Jan. 1997 doi: 10.1109/78.552217.

* cited by examiner

ON-SITE CALIBRATION OF ARRAY ANTENNA SYSTEMS

CROSS-REFERENCE TO RELATED APPLICATION

This application claims priority to pending U.S. patent application Ser. No. 14/547,461, filed on Nov. 19, 2014, and entitled "On-Site Calibration of Array Antenna Systems," the entire disclosure of which is incorporated herein by reference.

BACKGROUND OF THE INVENTION

1. Field of the Invention

The present invention relates generally to antenna systems, and particularly to array antennas as used in radars, communications or radiometry.

2. Technical Background

The term radar is an acronym that stands for "radio detection and ranging." A radar system transmits radio frequency (RF) signals in a predetermined direction (i.e., a bearing or angle-of-arrival) with the intention of contacting or illuminating moving objects ("contacts"). When the transmitted radar signal illuminates a contact, a return signal is reflected back toward the radar receiver. The return signal is detected if the return signal is stronger than any noise signals that may be present in the receiver. A contact's bearing corresponds to the direction of the transmitted radar signal because the signal travels at the speed of light. The distance, or "range," is determined by measuring the time between signal transmission and the reception of the return signal. Thus, radar systems are commonly used in commercial and military settings for purposes of identifying and tracking a radar contacts within a predetermined search volume. The radar systems described in the present invention are directed toward phased array radar systems that determine the angular direction, i.e., the angle-of-arrival, of a target relative to the phased array antenna.

A monopulse radar system is a type of radar that is often used for surveillance and tracking radar systems. Monopulse radar systems are often implemented using phased array antennas and digital beamforming processors. The term monopulse refers to the fact that a monopulse radar transmits a single radar pulse during transmission. If there is a radar target in the search volume, the transmitted signal will be reflected by the target; and the return echo is used to measure the angle of the target. Specifically, when a phased array antenna includes N antenna elements (N being an integer value), the N antenna elements will provide N signals $s(1), \ldots, s(N)$, respectively, to the receiver's beamforming processor. The beamforming network divides each of the N input signals $s(n)$ to create two signal paths that are linearly weighted and combined to provide a sum ($\Sigma$) beam and a difference ($\Delta$) beam. The amplitude of the sum beam ($\Sigma$) is symmetrical, with its maximum at the boresight. The amplitude of the difference beam ($\Delta$) is antisymmetrical and is equal to zero at the boresight. The angular direction of a target with respect to the antenna boresight is determined by finding the "monopulse ratio" for the expression:

$$\Delta(\theta)/\Sigma(\theta),$$

Which is typically a function of the array element spacing, N the number of sensor elements, and $\lambda$ is the wavelength of the transmitted radar pulse. The angular direction is, of course, estimated angle ($\theta$) of the target. Once the monopulse ratio is determined, the estimated angle ($\theta$) is retrieved from a look-up table in memory. Before the system is put in the field, however, the antenna must be measured and calibrated such that the angular direction ($\theta$) values are accurate.

Calibration therefore refers to accurately relating the receive antenna beam-port complex voltages of a radio frequency (RF) sensor, such as a radar, to the corresponding angular directions of a detected target. Calibration also maximizes mainbeam gain and lowers the sidelobes. While radar systems are specifically addressed herein, the present invention applies equally well to any multiport RF sensors designed to determine angle of arrival of incident waves, such as radio astronomy, communications or radiometry.

Antenna arrays radiate electromagnetic (EM) fields in response to voltage excitations at beamformer ports of the antenna or, equivalently, at element ports. The elements refer to the individual radiators in the array. Conversely, EM fields impinging on antenna arrays excite voltages at the beamformer and element ports. For many antenna applications, it is important to create tables that accurately relate the voltages to the corresponding radiated EM field patterns (in transmit; the patterns relate the field values to direction) or to the directions of incident fields (in receive). Antenna calibration is the means of ensuring that these tables are accurate.

FIG. 1 is a diagram of a conventional system that uses an internal calibration coupler feed. Those of ordinary skill in the art will appreciate that calibration couplers can be employed for both transmit and receive calibration. A calibration signal from a central source is split many ways in a manifold and a nominally-equal proportion is coupled into each element channel 1 at some point behind the radiating element. The signal level at the receiver can then be adjusted accordingly to produce the desired performance characteristics for the array antenna. When using a calibration coupler 1-1, a portion of the element channel is not included in the calibration process. One drawback to this approach relates to the fact that a portion of the element channel (i.e., the antenna dipole elements and the ground plane) is not included in the calibration process. Another drawback to using internal calibration couplers relates to their physical size. The couplers 1-1 can be relatively large; and the array antenna must incorporate them into the design without sacrificing performance. Yet another drawback relates to the differences in the coupling efficiency at each element channel. The accuracy of antenna calibration is limited by the calibration couplers 1-1 themselves, and to the extent that the individual coupler outputs can be known. In other words, the couplers and the feed network are a source of error in and of themselves.

In another approach, some antenna systems are equipped with a means for sensing element channel path variations and the ability to recover the original state at which the antenna was first calibrated. These systems are fitted with a transmitter and receiver "probe" that is usually attached to an edge of the antenna. The probe periodically generates or receives a signal that is recorded in or from all antenna element channels. Variations in amplitude and phase of each element channel path are monitored and compensating attenuator and phase shifts are applied to adjust the array into coherent transmit and receive alignment. One drawback to this approach relates to the resolution of the attenuators and phase shifters needed for precise compensation. In addition, the signal to or from the probe must remain stable over time (i.e. several years) and this is difficult, if not impossible, to ensure. If the probe signal is imprecise, the compensation will also be inaccurate.

FIG. 2 is a diagram of a conventional phased array radar that uses an external probe to perform calibration. Each antenna element is connected to a beamforming summer 8 via a T/R module 7. Each T/R module includes a circulator 2 that couples the receive side and the transmit side to the antenna and at least one phase shifter element that couples the receive side and the transmit side to the summer 8. The transmit side typically includes a high power amplifier (HPA) 3 and the receive side includes a low noise amplifier (LNA) 4. The control element 9 is configured to toggle the switch 6 between transmit and receive operations as appropriate.

The calibration method places an external probe in front of the array face 1. The calibration process can be performed by the control block 9. In this scheme, the calibration process may require an appreciable amount of time (on the order of a few minutes). While full calibration may occur when the radar equipment is initialized, it may also be accomplished from time to time with the antenna stationary and dedicated to calibration. The transmit path calibration requires the sequential operation of one module at a time. The control block 9 effects the phase shifter states in each T/R module 7 by means of the control line 9-1 shown in FIG. 2, The control line 9-1 may be implemented as a bus system, whereby the phase shifter state is addressed to the appropriate T/R module 7 via an address bus. The enablement of one T/R module at a time during transmit path calibration, which is accomplished by disabling the other three modules and allowing the exciter signal to flow through only one module at a time, also avoids redundancy in the path through the T/R sub-assembly for the particular antenna element during transmit path calibration, assuming no mutual coupling between the circuits within the T/R sub-assembly.

Calibration for receive path calibration functions in much the same way as in the transmit path calibration. Under the control of the control block 9, the receive path calibration operates each DR module sequentially and one at a time so that the phase response of each phase shifter can be isolated and adjusted separately. One of the drawbacks to this approach—and the previous approach—is that the system under calibration is not operating under actual operating conditions. As a result, for example, the conventional calibration techniques outlined above cannot account for temperature variations.

For some array antennas, the beamformer/feed network can be separated from the radiators/balun/matching network so that element patterns can be measured with respect to these convenient ports. These patterns can then be combined with limited full-array measurements to yield calibration patterns for all beams. It isn't always practical, however, to measure element voltage gain patterns. This is especially true for nonplanar arrays whereby most elements experience different array environments and thus element gain patterns must be measured for many elements. Further, antenna arrays increasingly are being constructed of integrated componentry with few or no connectors. Decoupling the radiating part of the antenna from the beamformer/feed to enable such element pattern measurements at best introduces errors attributed to the componentry needed to connect to a receiver.

In another approach, a method for calibrating a relatively small conformal array antenna has been considered. For example, the US Army's Lightweight Counter Mortar Radar (LCMR) can be calibrated using pattern measurements of individual columns. The LCMR antenna is composed of 24 such columns deployed along a cylindrical contour. Each column is composed of a vertical beamformer and a linear vertical array of eight radiators. The column pattern data is combined with measurements of an azimuth combiner to yield calibration tables. The column voltage antenna patterns are measured either directly in an anechoic chamber or by combining bench-top apparatus measurements (of a column) with a computational electromagnetic (CEM) computer code analysis. One drawback to this approach relates to the fact that it is relatively time consuming because all columns must be measured individually. Moreover, these types of methods are error prone because the azimuth combiner is measured separately from the columns. Additional errors are introduced by the bench-top measurement because a "reference array" is needed to de-embed the radiating element part of the column from the beamformer part, and the connections between the reference array and instrumentation are not identical to the connections between the column array elements and beamformer. Perhaps most importantly, once in the field, temperature variations, mechanical stresses, and so forth degrade calibration. An efficient method of calibrating a complete system in an operational environment would not suffer these drawbacks.

Many modern antenna arrays incorporate digital phase shifters and/or attenuators at the element level. Even some versions of fixed-beam antennas have, for test purposes, built-in controllable phase shifters. For calibration, well known methods have been developed for measuring the signal received from each array element and for each phase shifter state of an array antenna while the associated system (radar or communications, etc.) is in an operational environment by cycling through the phase shifter states, collecting data with a receiving and transmitting probe, and with this data estimating the complex amplitudes and phases corresponding to all elements and phase shifter states (or the one operational state, for a fixed beam antenna). The problem is that the calibration does not directly indicate how the antenna pattern may have been altered in directions other than that of the probe.

Briefly stated, conventional calibration techniques employ internal monitor feeds (most common system) or external probes. In the first approach, calibration is carried out by using monitor feeds that are coupled to corresponding antenna elements. As noted above, this approach has the following drawbacks: antenna element level effects are not taken into account, only the array normal signal is calibrated; and calibration is no more accurate than the monitor feed itself. In the second approach, an external probe is used. While this approach avoids the monitor feed errors, heretofore, it only provides antenna calibration in the direction of the probe.

What is needed is a calibration method that overcomes the drawbacks outlined above. Namely, a calibration system and method is needed that takes into account antenna element level effects, is not limited in any way by internal monitor feed limitations and provides calibration in all desired directions. In other words, a calibration method is needed that can directly indicate how the antenna pattern may have been altered in directions other than that of the probe by taking into account the far field antenna element patterns of all antenna elements for all angles-of-arrival ($\theta$, $\varphi$) at all system frequencies.

SUMMARY OF THE INVENTION

The present invention is directed to a method for calibrating an array antenna that addresses the needs and drawbacks described above. The method of the present invention may be used to calibrate any antenna array including conformal (nonplanar) antenna arrays. The calibration method of the present invention directly indicates how the antenna pattern may have been altered in directions other than that of the probe by taking into account the far field antenna element patterns of all antenna elements for all angles-of-arrival ($\theta$, $\varphi$) at all system frequencies. The calibration method of the present invention takes into account mutual coupling and typical system operating temperatures because it can be performed with all of the T/R modules in operation. The method combines computational electromagnetic (CEM) code analysis with relatively few measurements that may be easily carried out in an operational environment. The method makes use of element level controllable digital phase shifters and/or attenuators enabling measurements to be made with the array in fully powered up mode. The method applies to transmitting as well as receiving antenna arrays.

One aspect of the present invention is a system comprising: a probe antenna configured to transmit or receive a calibration signal; an antenna including a plurality of antenna elements arranged in an antenna configuration, the plurality of antenna elements providing a plurality of antenna excitation signals in response to the calibration signal; a beamforming network including a beamformer port and a plurality of channels, each channel including a signal conditioning module coupled to a corresponding antenna element of the plurality of antenna elements, the signal conditioning module having a plurality of conditioning states specifying at least one phase state, the plurality of antenna excitation signals corresponding to a plurality of complex voltages at the beamformer port; a control system coupled to the beamforming network, the control system being configured to select a conditioning state of the plurality of conditioning states in accordance with a calibration control rule; a memory configured to store a digital antenna model and far-field element voltage gain patterns corresponding to the antenna configuration, the memory storing a calibration table configured to associate each steering angle in a set of steering angles to beamformer port complex voltages; and a processor configured to compute calibration element voltage gain patterns as functions of the digital antenna model and the plurality of complex voltages, determine calibration through path transfer functions from the plurality of complex voltages, and remove the calibration element voltage gain patterns from the calibration through path transfer functions to determine a beamforming network transfer function, the processor being configured to revise the calibration table based on the beamforming network transfer function.

In one embodiment, the processor is configured to combine the beamforming network transfer function and the far-field element voltage gain patterns to obtain a system transfer function.

In one of version of the embodiment, the system transfer function associates each steering angle in the far-field element voltage gain patterns to a beamformer port complex voltages in accordance with the beamforming network transfer function.

In one embodiment, the set of steering angles is a function of frequency or system temperature.

In one embodiment, the beamformer network includes a receiver circuit, the set of steering angles providing angle-of-arrival information for an electromagnetic signal incident the antenna and received by the receiver.

In one embodiment, the beamformer network includes a transmitter, the set of steering angles providing scanning information for radiating an electromagnetic signal via the antenna at predetermined angle relative to the antenna's boresight.

In one embodiment, the antenna configuration is selected from a group of antenna configurations including a non-phased array antenna, a phased array antenna, a planar phased array antenna, a non-planar phased array antenna, a conformal phased array antenna, or a cylindrical phased array antenna.

In one embodiment, an antenna element of the plurality of antenna elements is selected from a group of antenna elements including horn antenna elements, reflector antenna elements, dipole antenna elements, loop antenna elements, or slot antenna elements.

In one embodiment, the sensor system includes a radar system.

In one version of one embodiment, the beamformer network further comprises: a beam summer coupled to the a plurality of channels, the beam summer being configured to combine a plurality of incident antenna excitation signals and provide at least one RF sum beam signal; a receiver coupled to the beam summer, the receiver being configured to translate the RF sum beam signal to an intermediate frequency (IF) signal; and at least one digital circuit element configured to convert the IF signal to thus provide at least one received complex voltage at the beamformer port.

In one version of one embodiment, the control system is configured to select the conditioning state for the plurality of channels in accordance with a predetermined receiver mode control rule.

In one version of one embodiment, the control system is configured to retrieve an angle-of-arrival from the set of steering angles in the revised calibration table corresponding to the at least one received complex voltage at the beamformer port.

In one version of one embodiment, the control system is configured to retrieve an angle-of-arrival from the set of steering angles in the revised calibration table corresponding to the at least one received complex voltage at the beamformer port, the control system or the processor being configured to find a monopulse ratio corresponding to the at least one received complex voltage.

In one version of one embodiment, the signal conditioning module is a transmit/receive (T/R) module, and the plurality of conditioning states are control bits for receive phase shifters or receive attenuators coupled to the beam summer.

In one version of one embodiment, the beamformer network further comprises: at least one digital circuit element configured to convert a complex voltage at the beamformer port into an analog signal; an upconverter network coupled to the at least one digital circuit element and configured to translate the analog signal into an RF transmit signal; a beam divider coupled to the upconverter network and configured to split the RF transmit signal into a plurality of radiated antenna excitation signals.

In one version of one embodiment, the control system is configured to select the conditioning state for the plurality of channels in accordance with a selected transmit steering angle in the set of steering angles.

In one version of one embodiment, the signal conditioning module is a transmit/receive (T/R) module, and the plurality of conditioning states are control bits for transmit phase shifters or transmit attenuators coupled to the beam divider.

In one version of one embodiment, the processor and the memory are disposed in the radar system housing.

In one embodiment, the processor and the memory are disposed in a calibration system housing.

In one embodiment, the system further comprises a CEM tool configured to generate the digital antenna model and the far-field element voltage gain patterns based on the antenna configuration.

In one embodiment, the calibration control rule is configured to direct the control system to sequentially operate one signal conditioning module at a time with all other deselected signal conditioning modules being disabled, the control system being directed to sequence through each of the plurality of conditioning states while operating the signal conditioning module.

In one embodiment, the calibration control rule is configured to direct the control system to operate the signal conditioning modules corresponding to the plurality of channels in accordance with a Hadamard control rule.

In one version of one embodiment, the Hadamard control rule requires (4+2p)N measurements of the calibration signal, wherein p denotes the number of the plurality of conditioning states.

In one embodiment, the beamforming network transfer function is given by the expression: $b(n)=s_0(n)/f_0(n)$, wherein $s_0(n)$ corresponds to the calibration through path transfer functions and $f_0(n)$ corresponds to the calibration element voltage gain patterns.

In one version of one embodiment, the system transfer function is given by the expression: $s'(n, \theta, \varphi)=b(n)f(n, \theta, \varphi)$, wherein $f(n, \theta, \varphi)$ corresponds to the far-field element voltage gain patterns.

In another aspect, the present invention includes a method comprising: providing a sensor system comprising an antenna including a plurality of antenna elements arranged in an antenna configuration, the plurality of antenna elements providing a plurality of antenna excitation signals in response to the calibration signal, the system comprising a beamforming network including a beamformer port and a plurality of channels, each channel including a signal conditioning module coupled to a corresponding antenna element of the plurality of antenna elements, the signal conditioning module having a plurality of conditioning states specifying at least one phase state, the plurality of antenna excitation signals corresponding to a plurality of complex voltages at the beamformer port, the system further including a control system coupled to the beamforming network, the control system being configured to select a conditioning state of the plurality of conditioning states in accordance with a calibration control rule, and a memory being configured to store a calibration table configured to associate each steering angle in a set of steering angles to beamformer port complex voltages; storing a digital antenna model and far-field element voltage gain patterns corresponding to the antenna configuration in the memory; propagating a calibration signal; computing calibration element voltage gain patterns as functions of the digital antenna model and the plurality of complex voltages; determining calibration through path transfer functions from the plurality of complex voltages; determining a beamforming network transfer function as a function of the calibration element voltage gain patterns and the calibration through path transfer functions; and revising the calibration table based on the beamforming network transfer function such that a revised calibration table is stored in memory, the revised calibration table being configured to associate each steering angle in a set of steering angles to revised beamformer port complex voltages.

In one embodiment, the method further comprises the step of removing the calibration element voltage gain patterns from the calibration through path transfer functions to obtain the beamforming network transfer function.

In one embodiment, the method further comprises the step of combining the beamforming network transfer function and the far-field element voltage gain patterns to obtain a system transfer function.

In one version of one embodiment the system transfer function associates each steering angle in the far-field element voltage gain patterns to the beamformer port complex voltages in accordance with the beamforming network transfer function.

In one embodiment, the system further comprises the step of generating the digital antenna model and the far-field element voltage gain patterns based on the antenna configuration prior to the step of storing.

In one embodiment, the calibration control rule is configured to direct the control system to sequentially operate one signal conditioning module at a time with all other deselected signal conditioning modules being disabled, the control system being directed to sequence through each of the plurality of conditioning states while operating the signal conditioning module.

The method of claim 26, wherein the calibration control rule is configured to direct the control system to operate the signal conditioning modules corresponding to the plurality of channels in accordance with a Hadamard control rule.

In one version of one embodiment, the Hadamard control rule requires (4+2p)N measurements of the calibration signal, wherein p denotes the number of the plurality of conditioning states.

In one embodiment, the beamforming network transfer function is given by the expression: $b(n)=s_0(n)/f_0(n)$, wherein $s_0(n)$ corresponds to the calibration through path transfer functions and $f_0(n)$ corresponds to the calibration element voltage gain patterns.

In one version of one embodiment, the system transfer function is given by the expression: $s'(n, \theta, \varphi)=b(n)f(n, \theta, \varphi)$, wherein $f(n, \theta, \varphi)$ corresponds to the far-field element voltage gain patterns.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
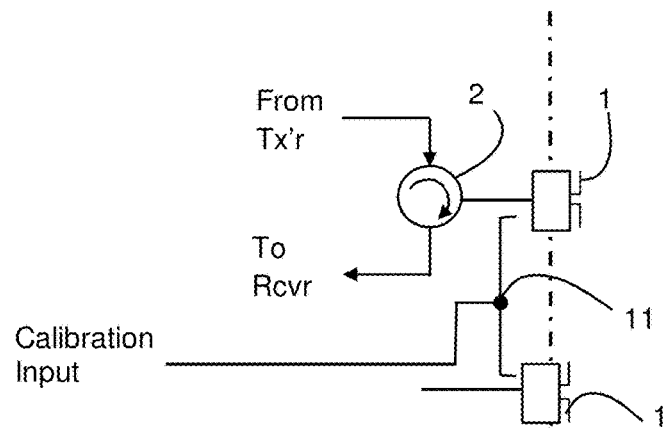
FIG. 1 is a diagram of a conventional calibration technique using an internal calibration coupler feed.
Figure 2:
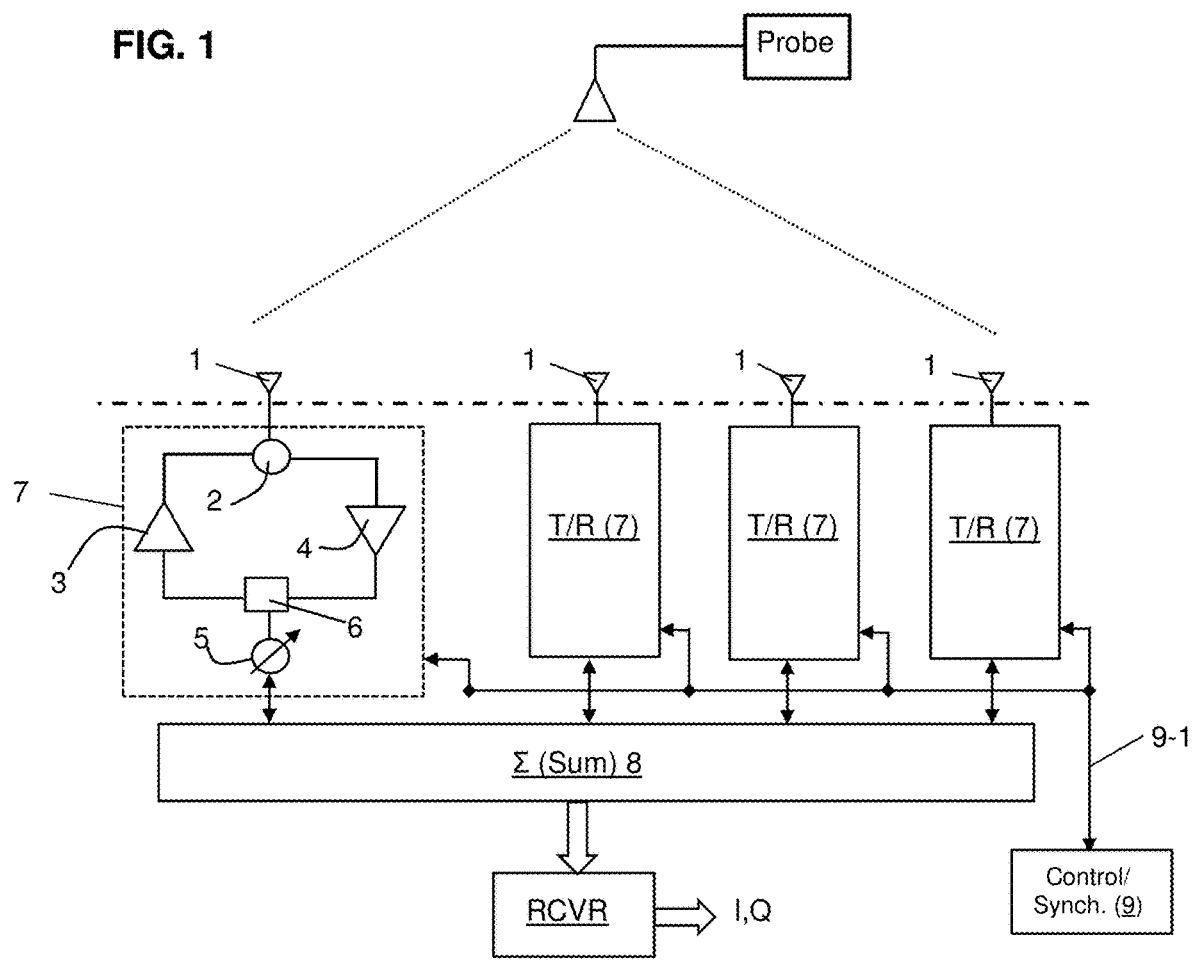
FIG. 2 is a diagram of a conventional calibration technique using an external probe apparatus.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the radar calibration system of the present invention is shown in FIG. 3, and is designated generally throughout by reference numeral 10.

Figure 3:
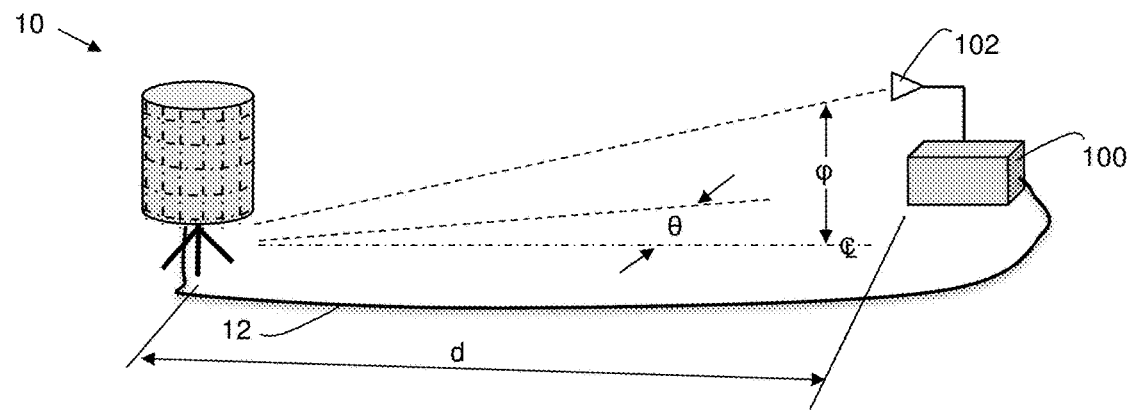
FIG. 3 is a diagrammatic depiction of a calibration set-up in accordance with one embodiment of the present invention.

As embodied herein, and depicted in FIG. 3, a diagrammatic depiction of an array calibration set-up in accordance with one embodiment of the present invention is disclosed. The array under test 10 is coupled to a test probe 100 by a communications link 12. The array 10 is shown as a non-planar array, but it should be appreciated that the present invention may be employed in a system that includes a planar phased array antenna. The probe need only be positioned at only one well surveyed point as part of updating the calibration; thus, the location of the probe relative to the antenna (i.e., d, $\theta$, $\varphi$) can be provided to the CEM tool. If the antenna array is non-planar, more than one probe may be used. If a cylindrical antenna is employed, the system may employ up to four probes (i.e., one in each quadrant). The probe location can be in the near field of the array and positioned to minimize opportunity for multipath. The CEM codes employed herein can accurately compute near field radiation.

In one embodiment of the invention, the phase shifters may be cycled through their individual states using a brute-force conventional approach whereby only one phase shift and attenuator path is energized at a time. In another embodiment of the invention, the entire array can be energized during the measurements to thus ensure that the array system is operating under normal environmental conditions when it is being calibrated. Thus, the calibration takes into account real-world issues such as temperature, mutual coupling, etc.

Briefly stated, the method of calibrating the radar system in accordance with the present invention is as follows. The measurements are made with the probe in some convenient location. The probe may be receiving or transmitting depending on whether the receive mode or transmit mode of the antenna under test (AUT) is being calibrated. (As noted above, the probe may need to be placed in several locations—perhaps four, one in each quadrant, for a cylindrical array—and data is obtained at each configuration to ensure that the probe is disposed within the element pattern of every element for at least one set of measurements. The data is used to obtain a through-path transfer function for each element channel as a function of the probe location(s). Next, the CEM tool performs code analyses of the AUT to obtain element voltage gain pattern values as a function of the probe location. The through-path transfer functions and the CEM data are combined and analyzed to determine the element channel transfer functions, i.e., the equivalent beamformer voltage sources which if applied to the antenna at appropriate element feed points would cause the array to radiate the full antenna patterns for each beam. Next, the CEM code is again applied to compute the far-field element voltage gain patterns for each beam. Finally, these full antenna patterns for each beam are combined with the beamformer element channel transfer functions to obtain the through-path transfer functions corresponding to all of the far-field element voltage gain patterns. These transfer functions form the basis of calibration and are used to obtain calibration tables that provide the voltages corresponding to each angle of arrival.

The present invention directly indicates how the antenna pattern may have been altered in directions other than that of the probe by taking into account the far field antenna element patterns for all angles-of-arrival ($\theta$, $\varphi$) at all system frequencies. To be specific, the calibration method of the present invention judiciously combines calibration measurements with the aforementioned computational electromagnetic (CEM) code analysis, such that both are applied where each is most applicable. Thus, the probe need be positioned at only one well surveyed point (or at most a few if the array is non-planar) as part of updating the calibration. Another of the features and benefits of the invention is that element voltage gain patterns are obtained without physically separating the feed/beamformer from the radiating structure. Still another feature and benefit of the invention relates to the fact that, in contrast with some conventional methods of calibration, a long-time stable receive probe very close to, or attached to, the antenna is not required, nor is high fidelity phase shifters and attenuators with which to recover original calibration values.

Although originally conceived for calibrating conformal array antennas, the present invention applies equally well to planar arrays, especially those with element patterns that differ between elements, as would occur with nonuniform lattices, edge effects, and support structure scattering.

Figure 4:
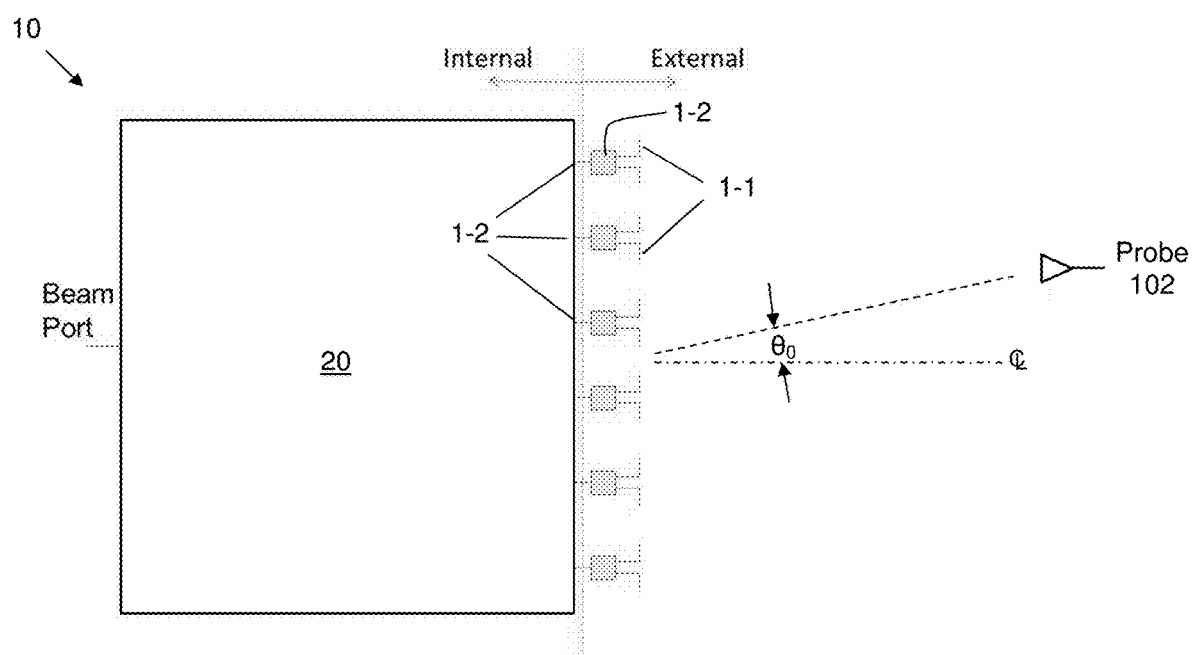
FIG. 4 is a high-level block diagram of the antenna-under-test shown in FIG. 3.

Referring to FIG. 4, a high-level cross-sectional diagram of the antenna-under-test shown in FIG. 3 is disclosed. The diagram is divided into two portions; the portion on the right shows the external (radiating) portion of the antenna array, which includes the antenna elements 1 and their associated integrated feedline baluns and impedance transformers 1-1. The interior portion includes the beamformer network 20. The division between "internal" and "external" is selected so that the feeds of the antenna elements can be reasonably well described by, and amenable to, CEM modeling.

Like FIG. 3, the test probe is depicted in the near field offset from the antenna boresight by some angle $\theta_0$. As described in greater detail below, the probe location is provided to the CEM tool in order to determine the voltage gain pattern values $f_0(n)$ corresponding to the probe location. The WIPL-D CEM codes, as well as other suitable modern CEM codes, are configured to model the exterior (radiating) region of an antenna array, i.e., the antenna elements 1 and their integrated feedline baluns and impedance transformers 1-1. In one embodiment, the processor configured to run the CEM code is disposed in the array itself; in another embodiment, the CEM processor is disposed in the probe housing 100 (see FIG. 3). The CEM code enables the accurate computation of voltage gain patterns for all elements. (The voltage element gain pattern, as it applies here, is obtained by computing the far field amplitude and phase patterns corresponding to the excitation of one element with a unit voltage source with all other elements terminated in short circuits—in contrast with conventional element gain patterns wherein the other elements are terminated in the generator, or feedline, impedance). The data obtained from the WIPL-D code, or any suitable CEM code is used to determine each element's contribution to a beam pattern, taking into account the varied environments of the elements, as well as mutual coupling, support structure scattering and so forth.

Because the probe would generally be installed in the near-field of the AUT, one might assume that a spherical correction would be done to correct for the different path lengths from each element to the probe, but this is not necessary because the CEM codes compute near fields from each element and near field coupling very accurately, including the spherical effect of the distance from each element to probe.

Figure 5A:
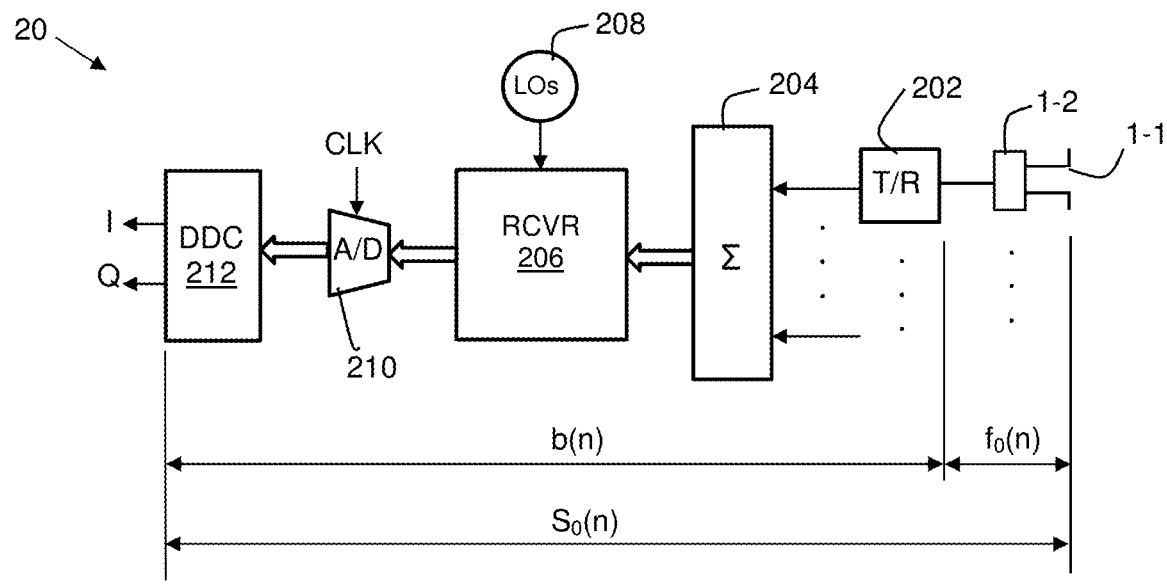
FIG. 5A-5B are detail diagrams of the AUT depicted in FIG. 4.
Figure 5B:
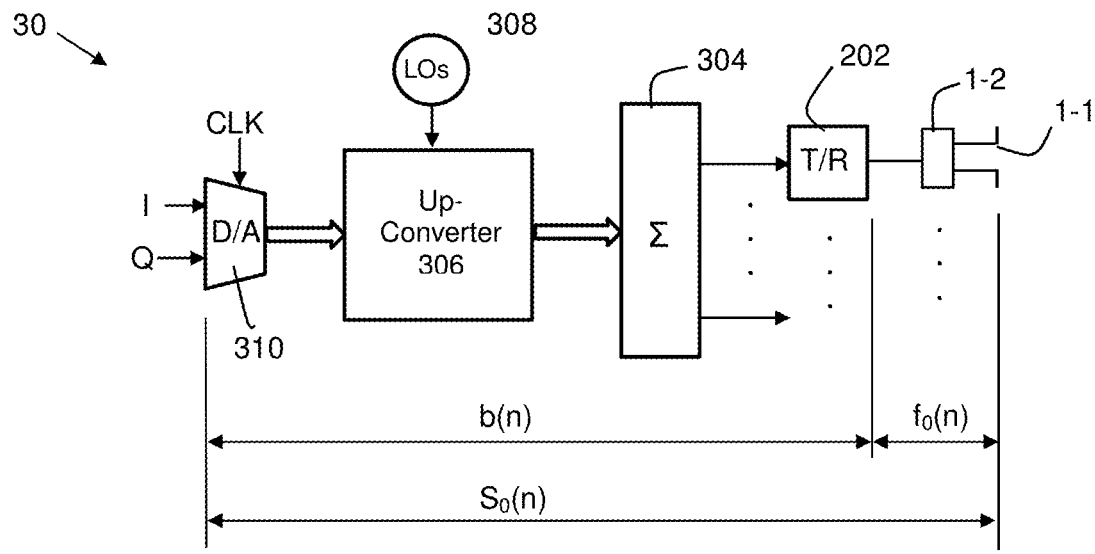

In reference to FIG. 5A-5B, detail diagrams of the AUT depicted in FIG. 4 are disclosed. Whether the transmit side or the receive side is being calibrated, all possible combinations of phase shifter (and attenuator) settings must be measured to arrive at the gain pattern in the probe location direction. Once these measurements are obtained, the present invention obtains the through-path transfer function for the particular probe location. The transfer function for the internal—i.e., beamformer circuitry—transfer function b(n) can be determined by "subtracting" the voltage gain pattern values $f_0(n)$ calculated by the CEM code (corresponding to the probe location) from the through-path transfer function for the particular probe location. Once the beamformer transfer function b(n) is determined, it is then combined with the far field antenna element patterns $f(n, \theta, \varphi)$—again, calculated by the CEM Code—to obtain the system transfer function s'((n, $\theta$, $\varphi$) for all angles-of-arrival ($\theta$, $\varphi$) and for all system frequencies. This allows for accurate angle of arrival, etc. measurements. The system transfer function s'((n, $\theta$, $\varphi$) can be used to develop a calibration table that is stored in array memory to properly interpret the baseband (I,Q) complex voltages such that the angle of arrival (receive) or the transmit beam are accurate.

In FIG. 5A, the receiver through path transfer function $S_0(n)$ is shown to be comprised of the element voltage gain pattern $f_0(n)$ and beamformer channel transfer function b(n). Each antenna element captures an RF signal via the ambient environment. The RF signal traverses the impedance transformer 1-1 and is directed into the beamformer channel 20. The RF signal is phase shifted by the T/R module 202 and combined with other RF signals by the beam summer 204. The RF signals are translated from RF into IF by the receiver 206 and local oscillators 208. The IF signal is converted into a digital signal by the A/D converter. The digital down converter (DDC) 212 converts the signal to baseband and provides in-phase (I) and quadrature (Q) output signals. The I/Q signals are complex voltages that are used to derive the through-path transfer function $s_0(n)$ for the particular probe location. Moreover, depending on the nature of the system 10, the control system may be configured to find a monopulse ratio, an angle estimation ratio, a maximum likelihood angle estimation ratio, or a MIMO transfer function corresponding to the received complex voltages (I/Q).

In FIG. 5B, the baseband complex voltages (I, Q) are digitally upconverted and then are directed into the D/A converter 310 and subsequently analog translated in frequency into RF signals by the upconverter 306. The RF signal is divided by the splitter 304 so that parallel RF signals are directed into the parallel T/R modules 202. The transmitted RF signal exits the beamformer portion of the antenna channel and is directed into the balun/impedance transformers 1-1 and subsequently radiated into the ambient environment by the antenna elements 1. In reference to FIG. 3, as the calibration control procedure cycles through all of the various phase shifter (and attenuator) states, the RF energy it captured by the probe antenna and the probe receiver converts the RF energy into baseband complex voltages (I, Q) that are again used to derive the through-path transfer function $s_0(n)$ for that particular probe location.

One of the insights of the present invention is that the beamformer channel transfer function b(n) is not a function of the angle-of-arrival; and this fact allows the calibration processor to combine the beamformer channel transfer function b(n), obtained from the probe measurements, to be combined with the far-field element voltage gain pattern $f(n, \theta, \varphi)$ to ultimately determine extremely accurate calibration data.

Figure 6:
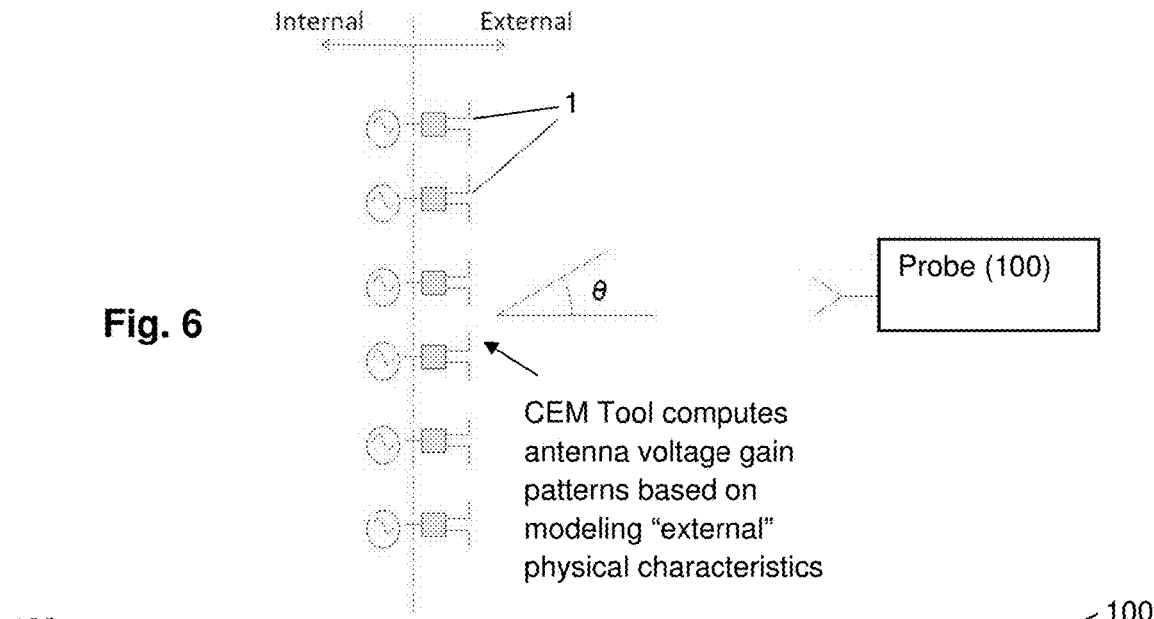
FIG. 6 is a high-level block diagram illustrating the computation electro-magnetic modeling (CEM) tool in accordance with an embodiment.

Referring to FIG. 6, a high-level block diagram illustrating the computational electro-magnetic modeling (CEM) analysis configuration in accordance with an embodiment is disclosed. The present invention contemplates selecting an appropriate CEM tool (based on the type of antenna being calibrated) to model the antenna in accordance with the antenna's physical characteristics. (Examples of physical characteristics include a phased array antenna that uses a predetermined type of antenna elements as well as their integrated balun feedlines. The model arranges the elements in the array and specifies the distances between adjacent elements. The model can accommodate planar arrays, general conformal arrays or cylindrical arrays. Moreover, the antenna need not be a phased array antenna; it may be a wire antenna or a dish antenna. The present invention is directed to any type of system, i.e., it is not limited to the problem of calibrating radar systems. For example, the system being calibrated can be configured as a radar system, a sensor system, a communication system, a Multiple Input Multiple Output (MIMO) system or a radiometry system to name a few. Once the CEM tool models a given AUT, it is reduced to a software program that is configured to run on a properly sized processing engine that can accept user inputs (i.e., the probe location relative to the AUT, signal input data, etc.) in the field in order to calibrate the AUT. The processing engine could be configured to the calculate the antenna radiation pattern for the modeled antenna structure in the field or it could be applied at some convenient time before the system is even brought to the field. Only the results of the modeling are needed to accompany the system. This option can greatly reduce the amount of real time processing required to update calibration.

Those skilled in the art will appreciate that any suitable CEM tool may be employed to implement the present invention. Moreover, there are many different types of CEM tools that are commercially available. The present invention is not directed toward the development of a CEM tool, but rather is directed to using the commercially available CEM tool best suited to a given application. For example, a CEM tool may be based on a "surface formulation method of moments (MoM)" approach. MoM is a numerical computational method of solving linear partial differential equations which have been formulated as integral equations (i.e. in boundary integral form). MoM is efficient in terms of computational resources for problems with a small surface/volume ratio. Another well-known CEM approach is commonly referred to as the "Finite-difference time-domain (FDTD)" technique. FDTD may be characterized as a grid-based differential time-domain numerical modeling method with absorbing boundary conditions. Still another popular CEM method is known as finite element method (FEM). FEM is configured to find approximate solutions to partial differential equations (PDE) and integral equations. Those skilled in the art will appreciate that the present invention is not limited to any of these CEM techniques; the aforementioned examples are merely provided to illustrate that any suitable CEM tool may be used to adapt the present invention to a give calibration problem (antenna configuration).

Any suitable computational electromagnetic (CEM) code can be used to determine the voltage gain patterns in accordance with the present invention. In one embodiment, the present invention employs the well-known WIPL-D CEM code that is available at www.wipl-d.com. Reference is made to "Electromagnetic Modeling of Composite Metallic and Dielectric Structures (Branko M. Kolundzij a, Antonije R. Djordjevic)," which is incorporated herein by reference as though fully set forth in its entirety, for a more detailed explanation of the WIPL-D code. Reference is also made to A. J. Fenn, et. al., "*Linear Array Characteristics with One-Dimensional Reactive-Region Near-Field Scanning: Simulations and Measurements,*" IEEE T-AP, Vol. 39, No. 9, September 1991 for an additional detailed explanation of CEM tools and an illustration of the accuracy of which these codes can model antennas. Reference is further made to Kolundzij a, B., Ognjanović, J., Sarkar T., "Analysis of composite metallic and dielectric structures—WIPL-D code", Proc. of 17th Applied Computational Electromagnetics Conf., Monterey, Calif., pp. 246-253, March 2001 for an additional detailed explanation the WIPL-D code. Reference is further made to Olcan, D. I., Kolundzija, B. M., "On Calculating Transient EM Responses with WIPL D", 26th Annual Review of Progress in Applied Computational Electromagnetics (ACES), Tampere, Finland, pp. 673-678, Apr. 26-Apr. 29, 2010 for additional detailed explanation of CEM tools and the WIPL-D code.

Figure 7:
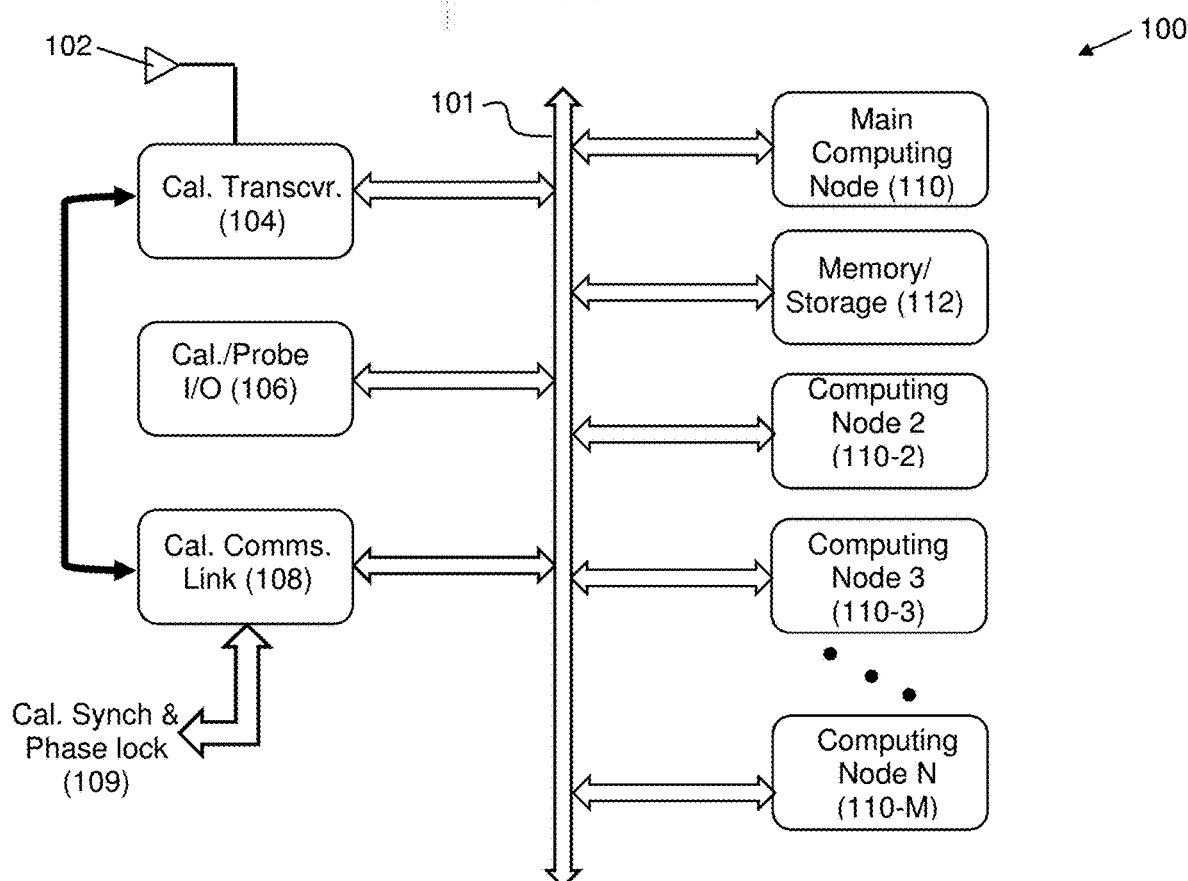
FIG. 7 is a diagrammatic depiction of the processing engine in accordance with an embodiment of the present invention.

As embodied herein and depicted in FIG. 7, a diagrammatic depiction of the processing engine in accordance with an embodiment of the present invention is disclosed. In this view, the processing engine is shown as being disposed in the probe 100, but it need not be. The processing engine may be arranged as an integral part of the system (e.g., a radar system, a sensor system, a communication system, a Multiple Input Multiple Output (MIMO) system or a radiometry system.).

In this embodiment, the probe 100 includes an antenna 102 coupled to a probe RF transceiver 104. The transceiver is coupled to the system 10 via a calibrations communications link 109, which may be established by the cable 12 (See, FIG. 3). The RF transceiver 104 is configured to transmit to or receive from the antenna(s) 102 RF calibration signals. (As described herein, a general conformal or cylindrical AUT may require multiple antenna feeds). The RF transceiver 104 is coupled to the processing engine 110 by way of a bus or network fabric 101. The network fabric 101 also interconnects probe I/O devices 106. The probe 100 also includes a communications link 108 that is configured to establish data synchronization and RF phase lock with the antenna system.

The data synchronization may be implemented by a framing system that is based on the bandwidth of the system. For example, in a 1 MHz radar, the processing and communications between systems may be arranged in 1 μsec framing increments (i.e., the sample rate) based on Nyquist's sampling theorem. (This should not be confused with the system clock rate which may be significantly faster). Briefly, the frame timing synchronizes the transmission of the data between the two units such that each system is in perfect synchronization with calibration sequence. The term phase lock means that the RF local oscillators employed in the radar and in the probe are in-phase/coherent with each other (transmit and receive).

The processing engine may be implemented by a parallel processor cluster 110 such that the calibration may be performed in a timely manner. In other words, the amount of time devoted to calibration should be relatively small; the ultimate purpose of the radar is to detect and track targets. Time spent calibrating takes away valuable time from the mission. Thus, the parallel processing configuration shown herein may significantly reduce calibration time.

The CEM cluster 110 may include a main computing node 110-1 and N-1 additional computing nodes 110-2 to 110-M, wherein M is a integer number of computing nodes in the processing engine. As those of ordinary skill in the art will appreciate, the number M depends on the size of the engine itself. If the AUT is relatively simple to model, M will be relatively small. If, on the other hand, the AUT is relatively complex, then M may be much larger. Those of ordinary skill in the art will recognize that sizing processing requirements is within the skill of the ordinary artisan.

The main computing node 110-1 may include software configured to control the processing and data transfer within the processing engine. The computing nodes 110-2 to 110-N are tightly coupled and slaved to the main computing node 110-1 so that the processing engine operates efficiently, and as a single system, in order to support the computing operations described herein. The computing nodes 110-2 to 110-N provide processing resources on demand from the main computing node 110-1 in order to compute the element voltage gain patterns in a reasonable amount of time. The computing nodes (110-1 to 110-N) are tied together and cohesively directed by a software layer so that N-interconnected processors function as a single machine.

Those of ordinary skill in the art will appreciate that any suitable arrangement mat be employed herein. For example, the processing engine 110 may be implemented using any suitable arrangement of computing resources such as GPGPUs, multicore processors, FPGAs. NVIDIA, for example, has developed a graphic processor based parallel computing platform that provides a teraflop of floating point performance. The parallel processing capabilities provided by graphic processing platforms (GPGPUs) is now being employed for may embedded scientific applications. An example of a multicore processor suitable for digital signal processing is the Intel Core i7 processor which supports the Advanced Vector Extensions (AVX) and the AVX2. Other suitable devices may be available from NVIDIA, Mercury, ARM, or AMD. Those skilled in the art will recognize that the present invention should be construed as being limited to the aforementioned examples since processor selection and sizing are within the abilities of those of ordinary skill in the art.

With respect to processor sizing, in one embodiment, the calibration routine may be required to cycle through a minimum of one thousand (1000) pattern values for the one thousand (1000) beam directions, and in the case of a monopulse radar, perhaps three-thousand (3000). In addition, there may be one-hundred (100) or so points about each steered direction to get beam splitting angle estimation.

Those skilled in the art will appreciate that the present invention may use any suitable control algorithm to cycle through the T/R module states (i.e., phase shifter and attenuator states). For example, the present invention may cycle through each T/R module state—one at a time—with one phase shifter being active and the other inactive. Or a more sophisticated control algorithm may be employed that more efficiently cycles through these states.

For example, Reference is made to U.S. Pat. No. 5,572,219 or to Seth D. Silverstein, "Application of Orthogonal Codes to the Calibration of Active Phased Array Antennas for Communications Satellites," IEEE Transactions on Signal Processing, Vol. 45, No. 1, January 1997 which is incorporated herein by reference as though fully set forth in its entirety, for a more detailed explanation of a system and method for generating coherent calibration signals to a RF sensor having N antenna elements. While the present invention may be employed using any suitable calibration control method, the Silverstein method is employed in accordance with one embodiment of the present invention.

According to that control method, (4+2p)N measurements must be performed for transmit and receive for the probe position, and N is an integer value corresponding to the number of antenna elements in the array, and p is an integer value for the number of bits—or states—available in each phase shifter and attenuator. Thus, assuming that there are one-thousand (1,000) six-bit attenuators and 1,000 six-bit phase shifters, p is equal to twelve (12). Doing the math, the engineer sizing the processing engine will calculate: (4+2p)N=28,000 measurements. By way of non-limiting example, the engineer is given a further requirement that the beams can have twenty frequencies. As a result, the calibration routine for this particular AUT requires 20*28,000=560,000 calibration measurements. One can further assume a 1 MHz bandwidth and, as noted above, a "sample rate" 1 μsec and a 100 μsec dwell period for each measurement. In other words, the frame timing provided over cable 12 (FIG. 3) via timing signal 109 (FIG. 7) would require a phase shifter or attenuator state change every 100 μsec. Note that the 100 μsec frame rate is (100/BW), where BW in this example is 1 MHz. One reason for the multiple is that it would provide a 20 dB signal-to-noise ratio (SNR) of gain. With a 1 μsec chip rate, the processor would obtain 100 (I, Q) independent complex voltage measurements for each phase/attenuator state. When all is said and done, the calibration routine would require about $(5.6*10^5)*1*10^{-4}=56$ seconds for data capture in a dedicated calibration routine. In some embodiments, the antenna is stationary and the probe is deployed during the dedicated calibration routine. The processor Engine 110 in FIG. 7 is operating in the background to perform calibration phase/attenuator scheduling and process the measurements to determine the element voltage gain patterns at the probe location, the beamformer element transfer function and the far-field element voltage gain patterns for all angles of arrival within the 18.66 calibration interval (as much as possible).

Accordingly, for large phase arrays, the number of parallel processors M is a function of the number of antenna elements N. Recalibration may be performed on a dedicated basis after replacing T/R modules or replacing a subsection of the array.

Referring back to FIG. 7, the bus 101 may be implemented by any suitable bus or digital network fabric 14 that is configured to provide data communications between nodes and elements of the system. A digital fabric 14, e.g., may be implemented using interconnections such as PCI Express Gen 3, 40 GbE, and an InfiniBand fabric. A bus or digital fabric 101 may be configured to accommodate digital traffic at any suitable data rate (e.g., in excess of a few Gbit/s or more) depending on the implementation.

The probe 100 includes I/O devices 106 that enable operators to efficiently input data and operate the calibration system in the field. Input devices may also include, inter alia, keyboards including alphanumeric and other keys for communicating information and command selections to the processing engine 110. Other types of user input device include a cursor controls such as a mice, trackballs, or cursor direction keys for communicating directional information and command selections to control cursor movements on one of more display devices. With respect to output devices, operators may be provided with output devices such as a liquid crystal displays or LED displays to allow the operator to view input data or to provide the user with operational data.

The processing engine 110 can also be configured to send and receive data, including program code, through the fabric 101 and the communications interface 108.

The term "computer-readable medium" as used herein refers to any medium that participates in providing data and/or instructions to the processor for execution. Such a medium may take many forms, including but not limited to non-volatile media, volatile media, and transmission media. Non-volatile media include, for example, solid state devices, and optical or magnetic disks. Volatile media include dynamic memory devices. Transmission media may include coaxial cables, copper wire and fiber optic media. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Figure 8:
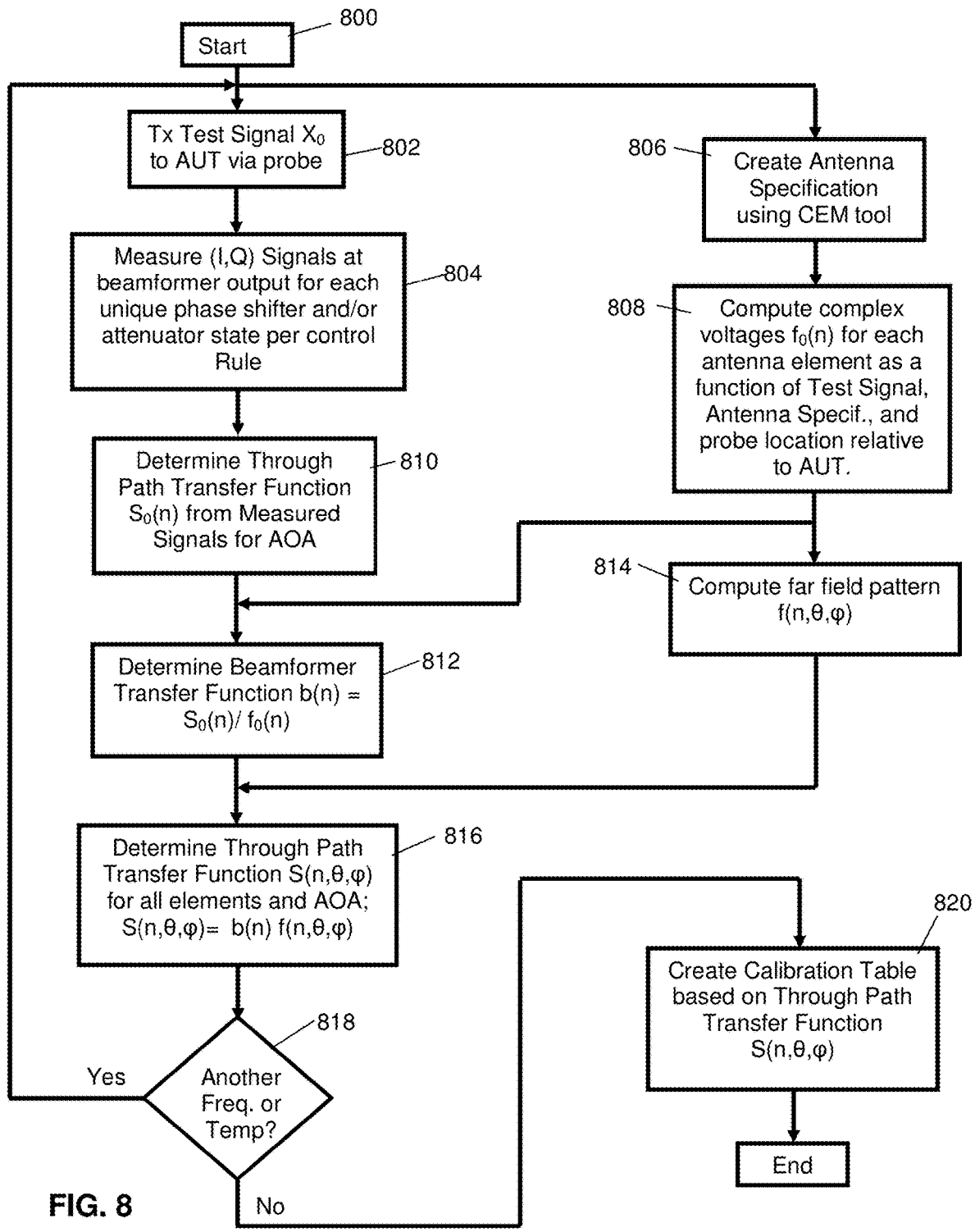
FIG. 8 is a flow chart illustrating a method for calibrating the AUT in accordance with one embodiment of the present invention.

Referring to FIG. 8, a flow chart illustrating a method for calibrating the AUT in accordance with one embodiment of the present invention is disclosed. While FIG. 8 is directed to receive side calibration, the transmit calibration is similar and the salient features of the invention are the same.

As described above, the processing engine is configured to create the antenna specification/model for the AUT (step 806) in what is typically a preliminary process step. In step 808, the user provides the processing engine with the location of the probe relative to the AUT and the processing engine calculates the antenna element voltage gain patterns $f_0(n)$ for the probe location. In step 814, the processing engine is configured to calculate the far-field element voltage gain pattern $f(n, \theta, \varphi)$ for all angles of arrival for each element of the N element array. Steps 806, 808 and 814 are not necessarily performed in the sequence shown, but the results of these calculations may be used in accordance with the sequence shown in FIG. 8. As noted above, the CEM tool may be based on any suitable CEM tool such as WIPL-D, which is commercially available at www.wipl-d.com.

In step 802, the probe transmits the test signal $x_0$ to the AUT. As noted before, the frame timing is employed to sequence through each state (phase shifter and attenuator) per the control rule. Again, any suitable control rule may be employed to sequence though each state. Once the data is obtained for each state, the processing engine is configured to determine the through path transfer function $s_0(n)$ for that particular probe location. In step 812, the processing engine processor obtains the beamformer through channel transfer function using the following equality:

$$b(n)=s_0(n)/f_0(n) \quad (1)$$

Once the CEM processor determines b(n), it can combine it with the far-field element voltage gain patterns to obtain the through path transfer functions:

$$s(n,\theta,\varphi)=b(n)f(n,\theta,\varphi) \quad (2)$$

In step 818, the calibration process determines if the above stated process should be performed for another radar operating frequency or another temperature. (The radar system typically includes a temperature sensor on one or more of the printed circuit boards disposed in the equipment rack. The temperature variations can change the beamformer transfer function b(n) and thus it is judicious to repeat the procedure for various ambient temperature increments as they become available. Thus, the calibration table stored in system memory will have angle of arrival values for the various discrete ambient operating temperatures.

Once the calibration procedure is performed for all frequencies and available ambient temperatures, the through path transfer function $s(n, \theta, \varphi, f, T)$ is employed to create a calibration table that is stored in the radar's memory. Thus, in reference to FIG. 5A, when the DDC 212 provides a complex voltage (I, Q), the radar processor can find the accurate response at a desired angle of arrival at the radar frequency and radar ambient operating temperature.

Figure 9:
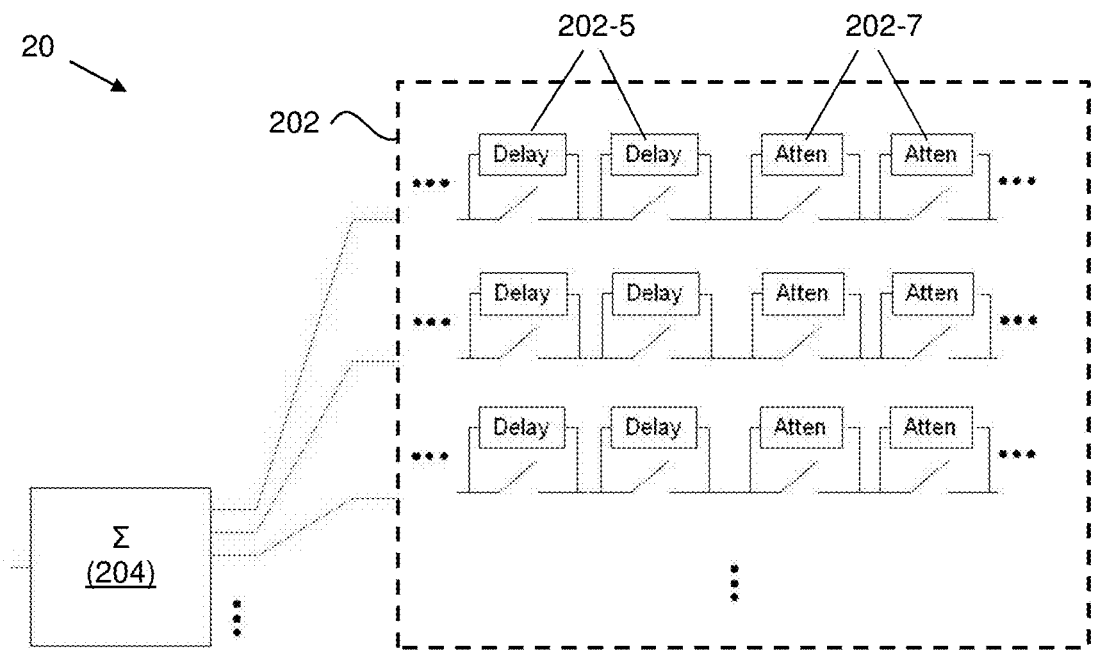
FIG. 9 is a detail diagram of a transmit/receive module in the AUT depicted in FIG. 5 for the purpose of illustrating a control rule in accordance with one embodiment of the present invention.
Figure 10A:
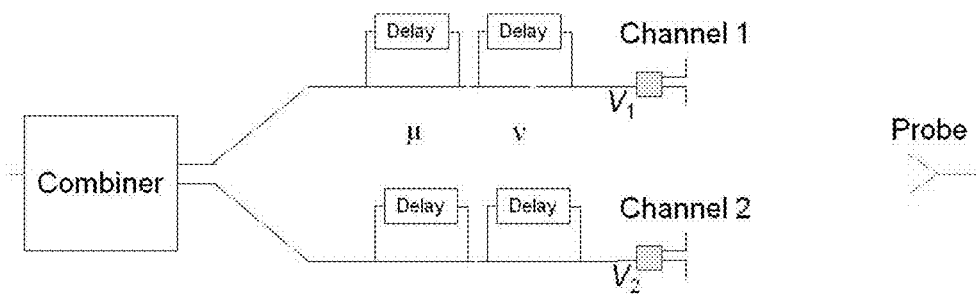
FIGS. 10A-10H are detail diagrams of a phase shifter bit configuration in a two channel signal path in accordance with an example embodiment.
Figure 10B:
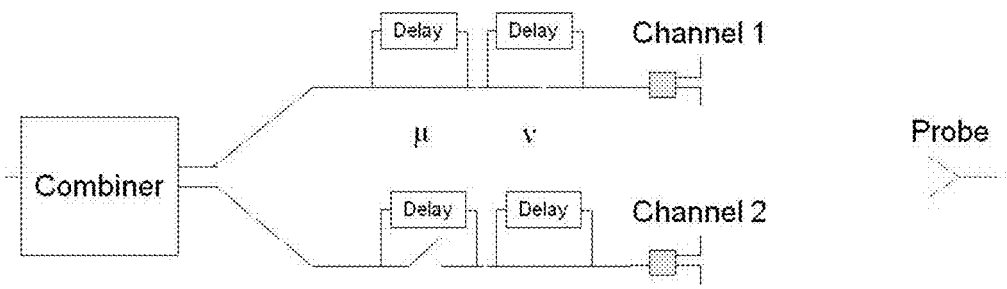
Figure 10C:
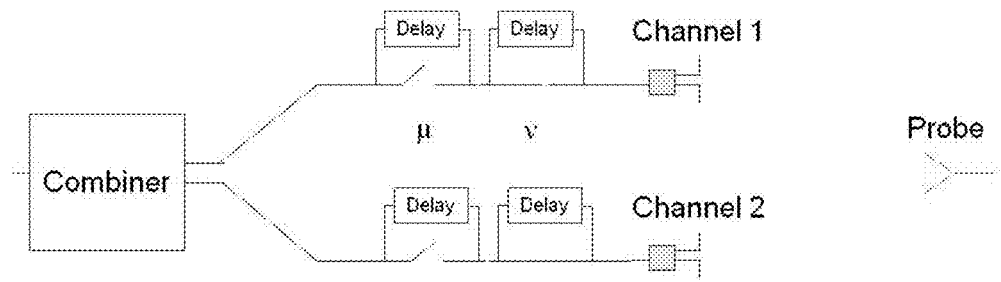
Figure 10D:
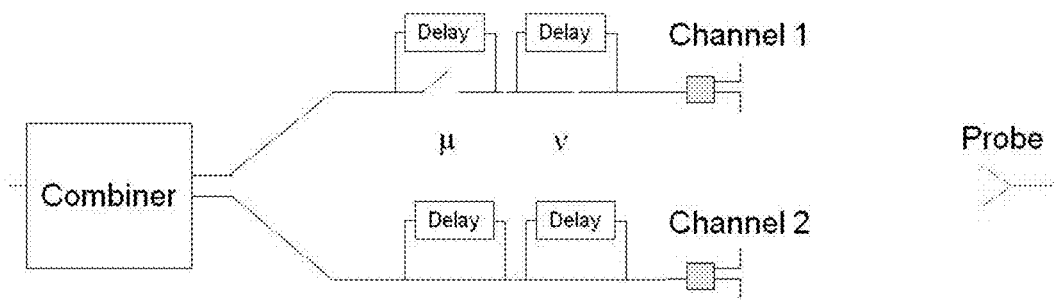
Figure 10E:
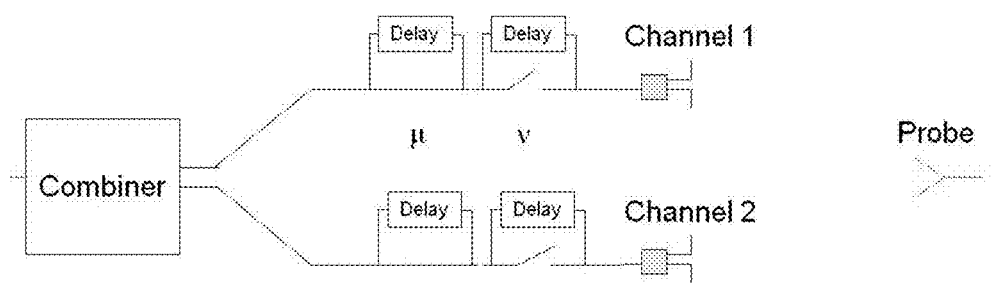
Figure 10F:
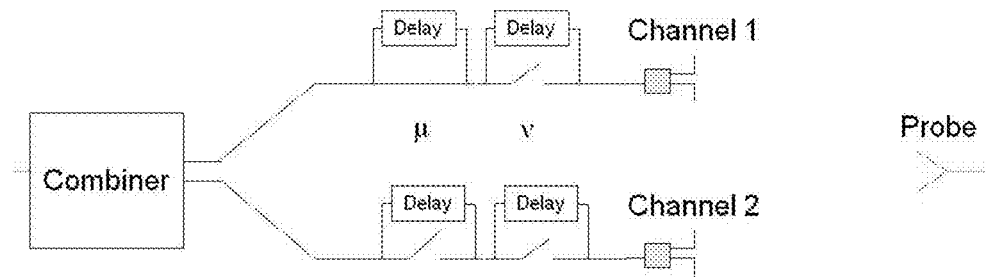
Figure 10G:
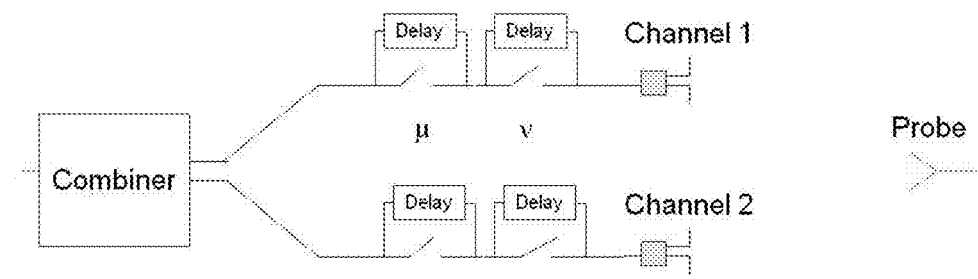
Figure 10H:
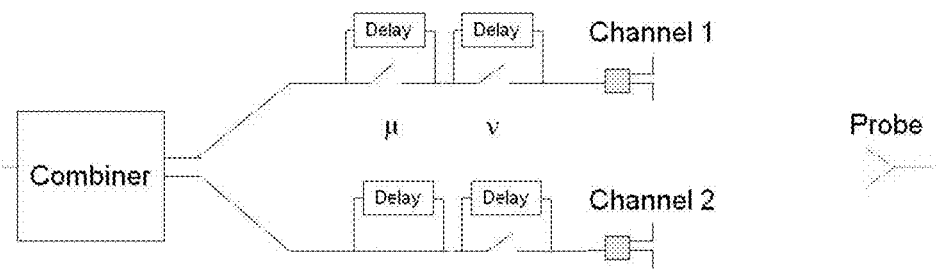

Referring to FIG. 9, a detail diagram of a transmit/receive module 202 in the AUT depicted in FIGS. 5A-5B is disclosed. The T/R module 202 is shown in order to illustrate a control rule in accordance with one embodiment of the present invention. In this example embodiment, each T/R module 202 channel includes two phase shifters 202-5 and two attenuator elements. As those skilled in the art will appreciate, the phase of an RF signal can be shifted by introducing a delay. When the delay element is toggled in (as shown), the RF signal must traverse the delay element and the RF output signal is phase shifted. Similarly, when the attenuator element is toggled in (as shown) the RF signal is attenuated. When either the phase shifter element 202-5 or the attenuator element 202-7 are toggled outwardly, the RF path is short circuited and no delay or attenuation is effected.

In one embodiment of the invention, a standard control rule can be employed to perform step 804: the phase states for one T/R module at a time are actuated in sequence with the remaining T/R modules 202 being turned OFF. While this method is effective and can certainly be employed by the present invention, more efficient control rules can be used as well.

In other embodiments, for example, efficient methods for performing measurements with the entire array powered up during all measurements can be employed. Again, reference is made to U.S. Pat. No. 5,572,219 or to Seth D. Silverstein, "Application of Orthogonal Codes to the Calibration of Active Phased Array Antennas for Communications Satellites," IEEE Transactions on Signal Processing, Vol. 45, No. 1, January 1997 which is incorporated herein by reference as though fully set forth in its entirety, for a more detailed explanation of a system and method for generating coherent calibration signals to a RF sensor having N antenna elements. This method can be applied to arrays with digital phase shifters and or attenuators at each element and that in turn are fed through the combining network 204 shown in FIG. 9. As noted above, this method requires (4+2p)N measurements for each frequency (and/or temperature) where p denotes the number of "bit" circuits in the digital phase shifters and attenuators and N the number of elements. With the probe fixed at one well surveyed location, the bits of the digital phase shifters and attenuators can be toggled in accordance with a Hadamard rule. From this data, each element's contribution to the antenna beam pattern (amplitude and phase) at the location of the probe can be determined. The method makes use of the Hadamard matrix for efficiently encoding the toggling scheme. The Nth order Hadamard matrix (H) is N×N bipolar orthogonal. Its elements are given the values +1 or −1. The matrices are known to exist for N>2 if the remainder of N/4=0. The inverse of H is given by its transpose divided by N. The "natural" forms of H can be generated recursively according to:

$$H_1 = [1]$$
$$H_{2N} = \begin{bmatrix} H_N & H_N \\ H_N & -H_N \end{bmatrix}$$

The bipolar Hadamard matrices are optimal with respect to minimizing variance estimates for the calibration parameters. Essentially, the method entails determining the transfer functions of, e.g., the vth bit circuit in all of the channels by recording two sets of measurements: one with all vth bits toggled out and another with all vth bits toggled in. (See, the delay bits 202-5 and the attenuator bits 202-7 shown in FIG. 9). Another bit in all of the channels is used in differentiating these measurements. Call it the μ bit. Each measurement involves an orthogonal arrangement of toggled in/out μ bits in all channels.

Consider an N-element array, each element associated with a "channel" containing a number of phase shifter and or attenuator "bits" that can be toggled in (e.g., delay) or out (e.g., no delay), and the channels combined into one port (denoted the "combiner port") via a combiner 204. The through-path transfer function from the combiner port through the nth element channel to the external probe with all "bits" toggled out is denoted as s(n). The deviation from s(n) with bit µ switched in is denoted as $d_\mu(n)$. The assumption is that the element n channel transfer function with, e.g., two bits (µ and v) switched in is given by $d_\mu(n) d_v(n) s(n)$. First, consider toggling in the µ bit of all channels in accordance with a "Hadamard control rule" with all other bits toggled out. N pairs of signals are recorded. The mth recorded signal pair is given by:

$$y_{\mu 0}^F(m) = \sum_{n=1}^{N} D_\mu^F(m, n) s(n)$$

$$y_{\mu 0}^R(m) = \sum_{n=1}^{N} D_\mu^R(m, n) s(n)$$

where the $D_\mu^F$ and $D_\mu^R$ are determined in accordance with the "Hadamard control rule:"

$$D_\mu^F(m, n) = \begin{cases} +1 & \mu\text{th bit of } n\text{th element switched out if } H(m, n) = +1 \\ d_\mu(n) & \mu\text{th bit of } n\text{th element switched in if } H(m, n) = -1 \end{cases}$$

$$D_\mu^R(m, n) = \begin{cases} d_\mu(n) & \mu\text{th bit of } n\text{th element switched in if } H(m, n) = +1 \\ +1 & \mu\text{th bit of } n\text{th element switched out if } H(m, n) = -1 \end{cases}$$

And y refers to the complex measurements at the probe for transmit cal or at the array output for receive calibration.

Denote column matrices of the $y_{\mu 0}^F(m)$ and $y_{\mu 0}^R(m)$ as $y_{\mu 0}^F$ and $y_{\mu 0}^R$ respectively, square matrices of the $D_\mu^F(m, n)$ and $D_\mu^R(m, n)$ as $D_\mu^F$ and $D_\mu^R$ respectively, and the column matrix of s(n) as s. For example, for N=4:

$$D_\mu^F = \begin{bmatrix} 1 & 1 & 1 & 1 \\ 1 & d_\mu(2) & 1 & d_\mu(4) \\ 1 & 1 & d_\mu(3) & d_\mu(4) \\ 1 & d_\mu(2) & d_\mu(3) & 1 \end{bmatrix}$$

$$D_\mu^R = \begin{bmatrix} d_\mu(1) & d_\mu(2) & d_\mu(3) & d_\mu(4) \\ d_\mu(1) & 1 & d_\mu(3) & 1 \\ d_\mu(1) & d_\mu(2) & 1 & 1 \\ d_\mu(1) & 1 & 1 & d_\mu(4) \end{bmatrix}$$

It follows that $$y_{\mu 0}^F = D_\mu^F s; y_{\mu 0}^R = D_\mu^R s$$

$$D_\mu^F - D_\mu^R = H(I - d_\mu)$$

Where $d_\mu$ denotes the N×N diagonal matrix of $d_\mu(n)$, n=1, . . . , N From the $y_{\mu 0}^F$ and $y_{\mu 0}^R$ probe or array output measurements and properties of the Hadamard matrix, it follows that $$z_{\mu 0} = H^{-1}(y_{\mu 0}^F - y_{\mu 0}^R) = (I - d_\mu) s \quad (1)$$

The process is repeated with the vth bit, v≠µ, switched in on all element channels and the µth bit switched according to the coding as before resulting in $$z_{\mu v} = H^{-1}(y_{\mu v}^F - y_{\mu v}^R) = (I - d_\mu) d_v s \quad (2)$$

From these equations the are determined simply by:

$$d_v(n) = z_{\mu v}(n) / z_{\mu 0}(n) \quad (3)$$

By repeating the process for all values of v≠µ, all corresponding $d_v$ are determined. To determine the $d_\mu$, the µ bit is permanently switched in and bit ξ(ξ≠µ) is switched according to the encoding as was the µ bit before resulting in $$d_\mu(n) = z_{\xi \mu}(n) / z_{\xi 0}(n) \quad (4)$$

The thru-path transfer functions s(n) are readily computed from either of $$s(n) = z_{\mu 0}(n) / (1 - d_\mu(n)) \quad (5)$$

and $$s(n) = z_{\xi 0}(n) / (1 - d_\xi(n)) \quad (6)$$

Accuracy is improved by averaging the s(n) values If the number of array elements ($N_e$) does not equal the order of a Hadamard matrix, choose N to be that which just exceeds $N_e$. Allow the array to be increased to N channels by introducing "pseudo-elements." The encoding transmissions corresponding to the additional pseudo-elements all will be zero, including their straight-through path signals.

There are limitations of this method that the current invention overcomes. One limitation, as had been indicated above, is that the thru-path transfer functions are dependent on the antenna radiating element environment and the location of the probe. The calibration does not directly indicate how the antenna pattern may have been altered in directions other than that of the probe. In receive mode, for example, calibration is crucial for accurately estimating the angle of arrival of an incident wave and the angular range of interest could be substantial. Further, with the prior art method, the probe needs to be in the far field of the antenna if the calibration is to apply to distant ranges from the antenna. The present invention avoids these deficiencies by judiciously combining measurement with analysis where both are most applicable. In this method, the aforementioned element port voltages are computed from the s(n) by "backing out" the element voltage gain pattern values $f_0(n)$ corresponding to the location of the probe according to $$s(n) = b(n) f_0(n) \quad (7)$$

where b(n) denotes the element channel transfer function between beamformer port and radiating element port. Thus $$b(n) = s(n) / f_0(n) \quad (8)$$

Let $f(n, \theta, \varphi)$ denote the far-field element voltage gain pattern of the nth element computed with a CEM code where θ, φ denote the pattern angle coordinates. It follows that the calibration applies for any pattern point if the s(n) are replaced correspondingly with $$s'(n, \theta, \varphi) = b(n) f(n, \theta, \varphi), \text{ or} \quad (9)$$

$$s'(n, \theta, \varphi) = \frac{s(n)}{f_0(\pi)} f(n, \theta, \varphi) \quad (10)$$

For planar arrays, only one probe location is required. The probe should be located within the beamwidth of the element pattern, but otherwise can be located outside any scanned beam. The latter positioning is necessary if the probe cannot be conveniently removed after calibration measurements. Further, the probe preferably should be positioned to minimize multipath to the degree possible. Elevating the probe tends to help reduce multipath. For conformal arrays several probe locations may be required to completely cover the entire field of view of the array. For cylindrical arrays, four locations are expected to be sufficient.

The element port voltage is the "total" voltage (as opposed to, for example, incident voltage). This voltage includes any mutual coupling from other elements. Mutual coupling may not be significant for reasonably spaced elements on convex curved conducting ground planes such as cylinders. Mutual coupling is dependent on the phase shift and/or attenuator setting of other element channels. The mutual coupling effect, if significant, would be an average of sorts of these settings. Further, this calibration method takes into account impedance matching, and the calibration method involves measurements with all elements active, as in an operational setting. This, and because the channels are designed to maintain impedance matching throughout, including mutual coupling effects, errors introduced by impedance mismatch should be small and not significantly affect the calibration accuracy.

Referring to FIGS. 10A-10H, detail diagrams of a phase shifter bit configuration in a two channel signal path in accordance with an example embodiment are depicted. To illustrate the method, consider an example embodiment that includes two channels, with two phase shift bit circuits per channel. Let μ denote an end "bit" on each channel and v the other bits. The transfer functions corresponding to toggling in the μ bit of the $n^{th}$ channel is denoted $d_\mu(n)$ and $d_v(n)$ denotes the v bit.

In reference to FIGS. 10A-10D, four probe to beamformer port measurements are made with the all bits toggled out and the μ bits toggled in accordance with the Hadamard control law described above. In reference to the control law equations provided above, $y^F_{\mu 0}(1)$, $y^F_{\mu 0}(2)$, $y^R_{\mu 0}(1)$, and $y^R_{\mu 0}(2)$ are the respective measured transfer functions. These measurements can be combined as follows:

$$z_{\mu 0}(1) = y^F_{\mu 0}(1) - y^R_{\mu 0}(1) + y^F_{\mu 0}(2) - y^R_{\mu 0}(2)$$

$$z_{\mu 0}(2) = y^F_{\mu 0}(1) - y^R_{\mu 0}(1) - y^F_{\mu 0}(2) + y^R_{\mu 0}(2)$$

In reference to FIGS. 10E-10H, the v bits are permanently toggled in and the μ bits are toggled as before, resulting in a second set of measurements. The measurements combine according to $$z_{\mu v}(1) = y^F_{\mu v}(1) - y^R_{\mu v}(1) + y^F_{\mu v}(2) - y^R_{\mu v}(2)$$

$$z_{\mu v}(2) = y^F_{\mu v}(1) - y^R_{\mu v}(1) - y^F_{\mu v}(2) + y^R_{\mu v}(2)$$

where the v subscript replaces the zero (0) in the earlier equations to distinguish the two sets of measurements. The v bit circuit transfer functions and through path transfer functions are determined from these z quantities by $$d_v(1) = z_{\mu v}(1)/z_{\mu 0}(1)$$

$$d_v(2) = z_{\mu v}(2)/z_{\mu 0}(2)$$

$$s(1) = z_{\mu 0}(1)/(1 - d_\mu(1))$$

$$s(2) = z_{\mu 0}(2)/(1 - d_\mu(2))$$

To determine the $d_\mu$, measurements are made with the v bits toggled according to the encoding as was bit μ before first with all bits toggled out and again with all μ bits permanently toggled in resulting in $$d_\mu(1) = z_{v\mu}(1)/z_{v0}(1)$$

$$d_\mu(2) = z_{v\mu}(2)/z_{v0}(2)$$

$$s(1) = z_{v0}(1)/(1 = d_v(1))$$

$$s(2) = z_{v0}(2)/(1 - d_v(2))$$

The two sets of through path transfer functions can be averaged to improve accuracy.

Figure 11A:
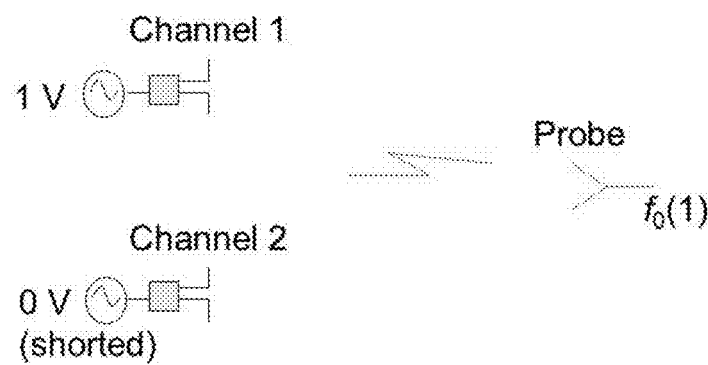
FIGS. 11A-11B are detail diagrams illustrating a configuration for determining element voltage gain patterns in accordance with an embodiment of the present invention.
Figure 11B:
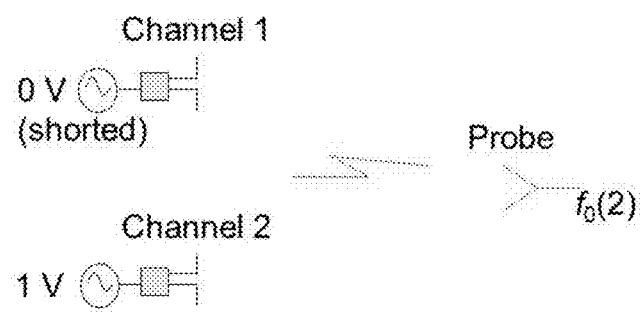

Referring to FIGS. 11A-11B, detail diagrams illustrating a configuration for determining element voltage gain patterns in accordance with an embodiment of the present invention is disclosed. In reference to the example provided in FIGS. 10A-10H, the next step in the example is to remove the probe-to-element transfer functions $[f_0(1)$ and $f_0(2)]$ from the through path functions. For this, the $f_0$ are determined with the CEM code in accordance with the configurations shown in FIGS. 11A-11B.

Figure 12A:
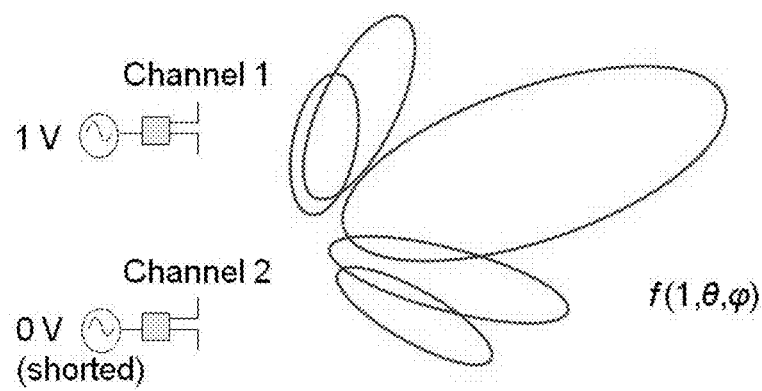
FIGS. 12A-12B are detail diagrams illustrating a configuration for determining far field element voltage gain patterns in accordance with an embodiment of the present invention.
Figure 12B:
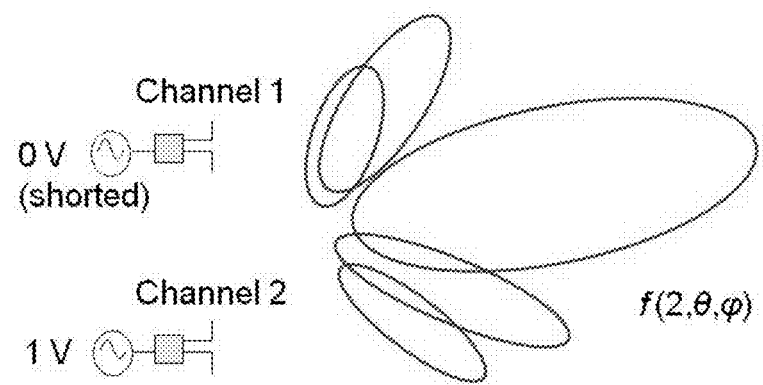

Referring to FIGS. 12A-12B, detail diagrams illustrating a configuration for determining far field element voltage gain patterns in accordance with the above example are disclosed. Finally, the through path transfer functions are extended by including the CEM generated pattern functions determined by the configurations of FIGS. 12A-12B. In sum, the modified through path transfer functions are given by:

$$s'(1, \theta, \varphi) = \frac{s(1)}{f_0(1)} f(1, \theta, \varphi)$$

$$s'(2, \theta, \varphi) = \frac{s(2)}{f_0(2)} f(2, \theta, \varphi)$$

As a result, well calibrated beam port antenna patterns are known for all bit configurations.

Note that due to the well-known reciprocity theorem of antennas, the $f_0$ and $f$ functions apply, within a trivial multiplicative constant, with probe transmitting instead of receiving and the beamformer port receiving instead of transmitting. Thus the receive mode can be calibrated by this procedure as well as the transmit mode.

Because the measurements are coherent, the probe and array must be coherently locked and the timing frames synchronized (e.g., 100 μsec intervals per a previous example). As shown in FIG. 3 (12) and FIG. 7 (109), a separate channel between array and probe is provided to provide the aforementioned phase locking and timing reference. In another embodiment of the invention, this synchronization channel 109 can be a wireless signal that is transmitted at an offset frequency; or as depicted in FIG. 3, it can be implemented using a reference signal transmitted via a non-radiating transmission line.

In another embodiment of the present invention, the complex channel transfer functions for each phase shifter/attenuator state may be obtained from amplitude only measurements. Reference is made to T. Takahashi, Y. Konishi, I. Chiba, "A Novel Amplitude-Only Measurement Method to Determine Element Fields in Phased Arrays," IEEE Transactions on Antennas and Propagation, Vol. 60, No. 7, pp. 3222-3230, July 2012, which is incorporated herein by reference as though fully set forth in its entirety, for a more detailed explanation of how the complex channel transfer functions for each phase shifter/attenuator state can be obtained from amplitude only measurements. (In this embodiment, the transmitting—or receiving—probe located at the field point need not be phase synched to the receiver. Amplitude and phase errors of phase shifters are uniquely extracted by identifying them with higher order Fourier coefficients in a measured array-power response. Once these error terms are obtained, a complex element field at every phase shift can be determined immediately. This method is more accurate than the conventional rotating electric field vector (REV) method described in [S. Mano and T. Katagi, "A Method for Measuring Amplitude and Phase of Each Radiating Element of a Phased Array Antenna," *Electron. Commun. Jpn. B, Vol.* 65, No. 5, pp. 58-64, 1982]. In the conventional REV method, the array-power response, i.e., the amplitude of signals transmitted or received by the entire array, is measured while the phase of one element is shifted from 0 degrees to 360 degrees. In principle, this array-power response becomes sinusoidal, and the corresponding element field is determined by its average and first-order Fourier sine and cosine coefficients). Amplitude measurements are simpler to obtain than phase measurements and may be more suited for on-site calibration.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A system comprising:
an antenna including a plurality of antenna elements arranged in an antenna configuration, the plurality of antenna elements providing a plurality of antenna excitation signals in response to the calibration signal received from a probe antenna;
a beamforming network including a beamformer port and a plurality of channels, each channel including a signal conditioning module coupled to a corresponding antenna element of the plurality of antenna elements, the signal conditioning module having a plurality of conditioning states specifying at least one phase state, the plurality of antenna excitation signals corresponding to a plurality of complex voltages at the beamformer port;
a control system coupled to the beamforming network, the control system being configured to select a conditioning state of the plurality of conditioning states in accordance with a calibration control rule;
a memory configured to store a digital antenna model and far-field element voltage gain patterns corresponding to the antenna configuration, the memory storing a calibration table configured to associate each steering angle in a set of steering angles to beamformer port complex voltages; and
a processor configured to compute calibration element voltage gain patterns as functions of the digital antenna model and the plurality of complex voltages, determine calibration through path transfer functions from the plurality of complex voltages, and remove the calibration element voltage gain patterns from the calibration through path transfer functions to determine a beamforming network transfer function, the processor being configured to combine the beamforming network transfer function and the far-field element voltage gain patterns to obtain a system transfer function, wherein the system transfer function associates each steering angle in the far-field element voltage gain patterns to a beamformer port complex voltages in accordance with the beamforming network transfer function.

2. The system of claim 1, wherein the set of steering angles is a function of frequency or system temperature.

3. The system of claim 1, wherein the beamformer network includes a receiver circuit, the set of steering angles providing angle-of-arrival information for an electromagnetic signal incident the antenna and received by the receiver.

4. The system of claim 1, wherein the beamformer network includes a transmitter, the set of steering angles providing scanning information for radiating an electromagnetic signal via the antenna at predetermined angle relative to the antenna's boresight.

5. The system of claim 1, wherein the antenna configuration is selected from a group of antenna configurations including a non-phased array antenna, a phased array antenna, a planar phased array antenna, a non-planar phased array antenna, a conformal phased array antenna, or a cylindrical phased array antenna.

6. The system of claim 1, wherein an antenna element of the plurality of antenna elements is selected from a group of antenna elements including horn antenna elements, reflector antenna elements, dipole antenna elements, loop antenna elements, or slot antenna elements.

7. The system of claim 1, wherein the system is configured as a radar system, a sensor system, a communication system, a Multiple Input Multiple Output (MIMO) system or a radiometry system.

8. The system of claim 7, wherein the beamformer network further comprises:
a beam summer coupled to the a plurality of channels, the beam summer being configured to combine a plurality of incident antenna excitation signals and provide at least one RF sum beam signal;
a receiver coupled to the beam summer, the receiver being configured to translate the RF sum beam signal to an intermediate frequency (IF) signal; and
at least one digital circuit element configured to convert the IF signal to thus provide at least one received complex voltage at the beamformer port.

9. The system of claim 8, wherein the control system is configured to select the conditioning state for the plurality of channels in accordance with a predetermined receiver mode control rule.

10. The system of claim 8, wherein the control system is configured to retrieve an angle-of-arrival from the set of steering angles in the revised calibration table corresponding to the at least one received complex voltage at the beamformer port.

11. The system of claim 8, wherein the control system is configured to retrieve an angle-of-arrival from the set of steering angles in the revised calibration table corresponding to the at least one received complex voltage at the beamformer port.

12. The system of claim 8, wherein the control system or the processor is configured to find a monopulse ratio, an angle estimation ratio, a maximum likelihood angle estimation ratio, or a MIMO transfer function corresponding to the at least one received complex voltage.

13. The system of claim 8, wherein the signal conditioning module is a transmit/receive (T/R) module, and the plurality of conditioning states are control bits for receive phase shifters or receive attenuators coupled to the beam summer.

14. The system of claim 7, wherein the beamformer network further comprises:
at least one digital circuit element configured to convert a complex voltage at the beamformer port into an analog signal;
an upconverter network coupled to the at least one digital circuit element and configured to translate the analog signal into an RF transmit signal; and
a beam summer coupled to the upconverter network and configured to split the RF transmit signal into a plurality of RF difference signals.

15. The system of 14, wherein the control system is configured to select the conditioning state for the plurality of channels in accordance with a selected transmit steering angle in the set of steering angles.

16. The system of claim 14, wherein the signal conditioning module is a transmit/receive (T/R) module, and the plurality of conditioning states are control bits for transmit phase shifters or transmit attenuators coupled to the beam divider.

17. The system of claim 7, wherein the processor and the memory are disposed in the radar system housing.

18. The system of claim 1, wherein the processor and at least a portion of the memory are disposed in a calibration system housing.

19. The system of claim 1, further comprising a CEM tool configured to generate the digital antenna model and the far-field element voltage gain patterns based on the antenna configuration.

20. The system of claim 1, wherein the calibration control rule is configured to direct the control system to sequentially operate one signal conditioning module at a time with all other deselected signal conditioning modules being disabled, the control system being directed to sequence through each of the plurality of conditioning states while operating the signal conditioning module.

21. The system of claim 1, wherein the calibration control rule is configured to direct the control system to operate the signal conditioning modules corresponding to the plurality of channels in accordance with a Hadamard control rule.

22. The system of claim 21, wherein the Hadamard control rule requires $(4+2p)N$ measurements of the calibration signal, wherein p denotes the number of the plurality of conditioning states.

23. The system of claim 1, wherein the beamforming network transfer function is given by the expression: $b(n)=s_0(n)/f_0(n)$, wherein $s_0(n)$ corresponds to the calibration through path transfer functions and $f_0(n)$ corresponds to the calibration element voltage gain patterns.

24. The system of claim 23, wherein the system transfer function is given by the expression: $s'(n, \theta, \varphi)=b(n)f(n, \theta, \varphi)$, wherein $f(n, \theta, \varphi)$ corresponds to the far-field element voltage gain patterns.

25. The system of claim 1, wherein the antenna excitation signals are generated in response to a calibration signal transmitted by the probe antenna or a calibration signal provided via the beamforming network.

26. The system of claim 1, wherein the probe antenna is disposed in a near-field of the antenna.

27. The system of claim 26, wherein the probe antenna is coupled to the control system by a communications link configured to establish data synchronization and RF phase lock with the control system.

28. The system of claim 27, wherein the communication link is selected from a group of communications links that include a wireline communications link, a wireless communications link, a digital communications link or an analog communications link.

29. A method comprising:
providing a system comprising an antenna including a plurality of antenna elements arranged in an antenna configuration, the plurality of antenna elements providing a plurality of antenna excitation signals in response to the calibration signal, the system comprising a beamforming network including a beamformer port and a plurality of channels, each channel including a signal conditioning module coupled to a corresponding antenna element of the plurality of antenna elements, the signal conditioning module having a plurality of conditioning states specifying at least one phase state, the plurality of antenna excitation signals corresponding to a plurality of complex voltages at the beamformer port, the system further including a control system coupled to the beamforming network, the control system being configured to select a conditioning state of the plurality of conditioning states in accordance with a calibration control rule, and a memory being configured to store a calibration table configured to associate each steering angle in a set of steering angles to beamformer port complex voltages;
storing a digital antenna model and far-field element voltage gain patterns corresponding to the antenna configuration in the memory;
propagating a calibration signal;
computing calibration element voltage gain patterns as functions of the digital antenna model and the plurality of complex voltages;
determining calibration through path transfer functions from the plurality of complex voltages;
determining a beamforming network transfer function as a function of the calibration element voltage gain patterns and the calibration through path transfer functions;
removing the calibration element voltage gain patterns from the calibration through path transfer functions to obtain the beamforming network transfer function; and
combining the beamforming network transfer function and the far-field element voltage gain patterns to obtain a system transfer function, wherein the system transfer function associates each steering angle in the far-field element voltage gain patterns to the beamformer port complex voltages in accordance with the beamforming network transfer function.

30. The method of claim 29, further comprising the step of generating the digital antenna model and the far-field element voltage gain patterns based on the antenna configuration prior to the step of storing.

31. The method of claim 29, wherein the calibration control rule is configured to direct the control system to sequentially operate one signal conditioning module at a time with all other deselected signal conditioning modules being disabled, the control system being directed to sequence through each of the plurality of conditioning states while operating the signal conditioning module.

32. The method of claim 29, wherein the calibration control rule is configured to direct the control system to operate the signal conditioning modules corresponding to the plurality of channels in accordance with a Hadamard control rule.

33. The method of claim 32, wherein the Hadamard control rule requires $(4+2p)N$ measurements of the calibration signal, wherein p denotes the number of the plurality of conditioning states.

34. The method of claim 29, wherein the beamforming network transfer function is given by the expression: $b(n)=s_0(n)/f_0(n)$, wherein $s_0(n)$ corresponds to the calibration through path transfer functions and $f_0(n)$ corresponds to the calibration element voltage gain patterns.

35. The method of claim 34, wherein the system transfer function is given by the expression: $s'(n, \theta, \varphi)=b(n)f(n, \theta, \varphi)$, wherein $f(n, \theta, \varphi)$ corresponds to the far-field element voltage gain patterns.

36. The method of claim 29, wherein the system is configured as a radar system, a sensor system, a communication system or a radiometry system.

* * * * *